June 2, 1970     E. F. WEISER     3,515,970
MOTOR CONTROL SYSTEM USING CURRENT DIVERTER
Filed June 13, 1967     13 Sheets-Sheet 1
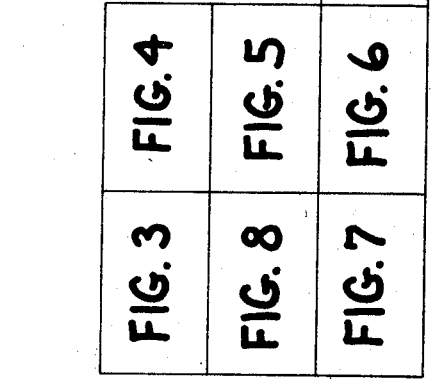
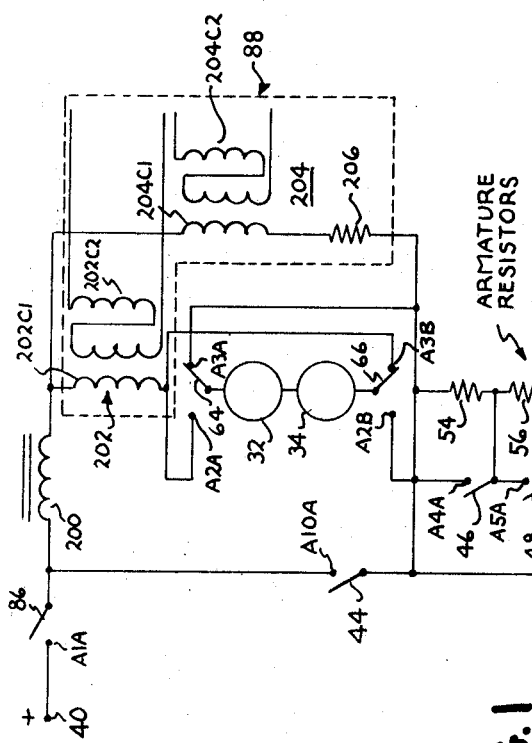
INVENTOR.
EARNEST F. WEISER
BY *Edward H. Loebel*
HIS ATTORNEY

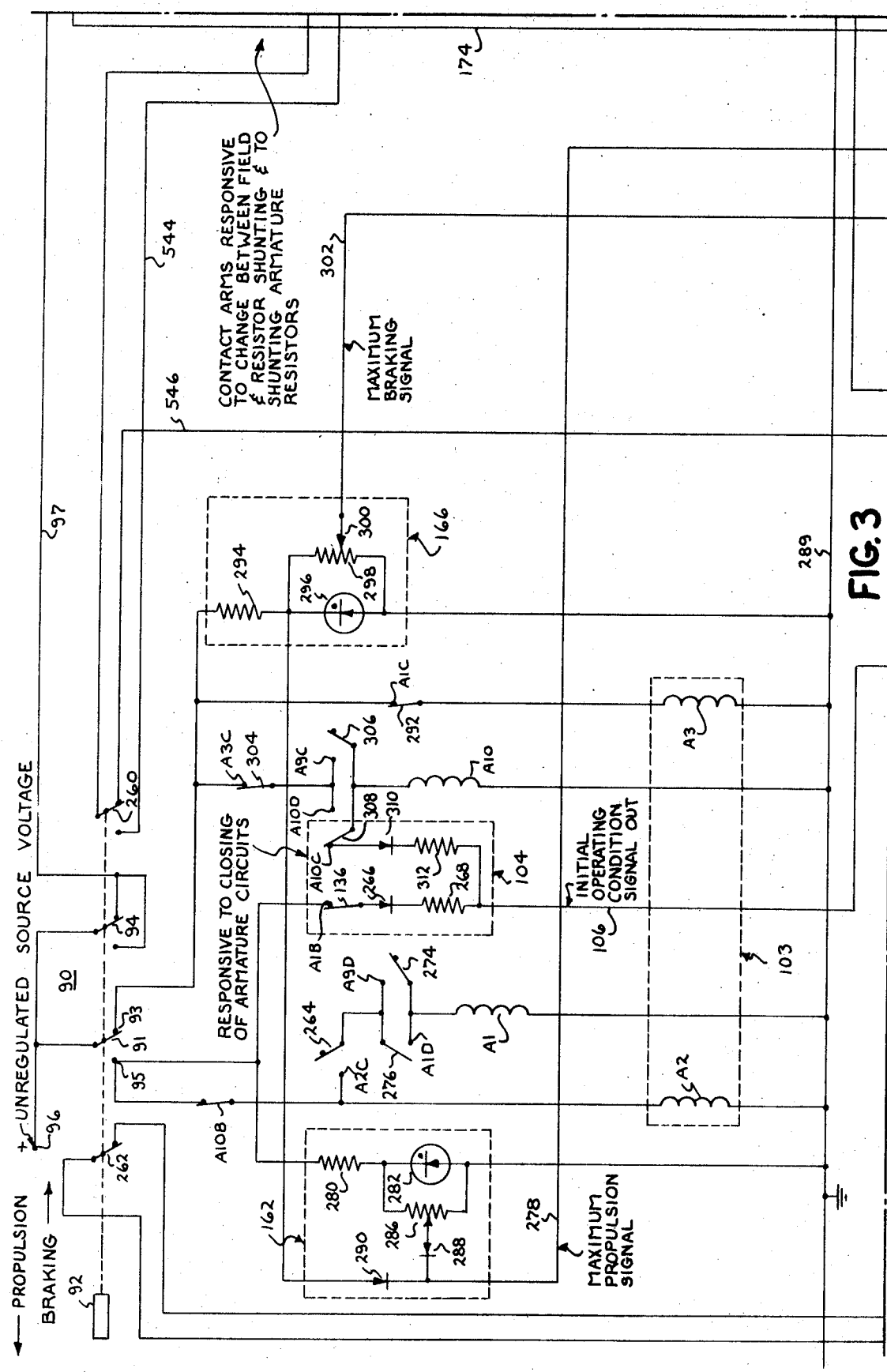

United States Patent Office 3,515,970
Patented June 2, 1970

3,515,970
MOTOR CONTROL SYSTEM USING
CURRENT DIVERTER
Earnest F. Weiser, Erie, Pa., assignor to General Electric
Company, a corporation of New York
Filed June 13, 1967, Ser. No. 645,747
Int. Cl. H02p 1/20
U.S. Cl. 318—249                                    35 Claims

ABSTRACT OF THE DISCLOSURE

A motor control system for controlling tractive effort produced by direct-current traction motors wherein a current diverter or chopper circuit provides a low impedance path which shunts current away from a motor field circuit or away from one of a plurality of series armature resistors for gradually varying portions of successive timing cycles to control the field excitation and the series armature resistance, respectively. When the field excitation is controlled, the diverter is connected through an RL shunting circuit to the field circuit itself. Significantly, a single controlled diverter circuit gradually decreases the series armature resistance. When the series armature resistance is controlled, one of the armature resistors is shunted by a switch each time the effective resistance of the diverter shunted armature resistor is decreased by an amount of the switch shunted resistor. Simultaneously, the diverter shunted resistor is reinserted by defining the diverter circuit.

Various control circuits in the motor control system synchronize the firing of controlled rectifiers of the current diverter with the opening and closing of various switches in the motor power circuit and with other events, such as the charging of commutating capacitors for these controlled rectifiers. A maximum rate at which changes in tractive effort can occur is established by a regulating circuit. A phase lead or differentiating network responds to the rate of change of the regulated armature current or armature voltage to compensate for the lagging response of the system to errors in the generation of tractive effort.

Inasmuch as the following description of a specific embodiment of this invention is of considerable length and is necessarily divided into a number of separate functional sections, the various sectional headings are serially numbered and listed below to facilitate immediate reference to corresponding portions of the specification.

TABLE OF CONTENTS

| | Column |
|---|---|
| General Description of Power Circuit | 6 |
| General Description of Control Circuits | 9 |
| Detailed Description of Power Circuit | 13 |
| Diverter Circuit | 15 |
| Propulsion or Braking Initiation Circuit | 18 |
| Field and Resistor Shunting Control | 20 |
| Sequential Resistor Shunting Control | 23 |
| Regulator Circuit | 24 |
| Contact Arm Movement Signals | 27 |
| Firing Signal Advance and Retard Control | 28 |
| Timing Cycle Generator | 30 |
| Firing Signal Generator | 31 |
| Sensing Circuits | 32 |
| Commutation Energy Control | 33 |
| Stabilizing Circuits | 33 |
| High Speed Braking Control Circuit | 35 |
| Separate Field and Resistor Shunting Diverters | 36 |
| Pre-positioning Control Circuit | 37 |

Background of the invention

This invention relates to motor control systems, and more particularly, it relates to control and regulation systems for traction motors.

While this invention is capable of numerous applications where motors are used, it is explained with respect to its use in traction systems where traction motor torque is controlled to vary the tractive effort produced by propulsion and braking systems.

In conventional motor control systems for traction motors, motor torque can be controlled at standstill or at any speed by varying field current and armature current of the motor. These systems have employed apparatus for sequentially switching a large number of contact arms to connect traction motors in series or in parallel with each other and to gradually increase and decrease motor field excitation and armature circuit resistance.

For example, in many conventional motor control systems armature current (and thus motor torque or tractive effort) is regulated by shunting and unshunting a plurality of resistors by means of electrical contacts. Each time one of the resistors is shunted or unshunted by a contact, an abrupt change occurs in the tractive effort of the motor. While it is more economical to use a simplified system which includes a small number of resistors for controlling the tractive effort, the addition of subtraction of one of these resistors results in a large, abrupt change in the tractive effort. Therefore, more complex and expensive systems have been devised in which the use of a larger number of resistors and contacts decreases the size of the changes in the tractive effort caused by this addition or subtraction of a resistor.

The size of mechanical systems required to open and close the contacts which shunt these resistors often limits the number of these resistors which may be used in a system. For example, where the contacts are controlled by camming surfaces mounted on a rotatable drum, the number of contacts which can be controlled is limited by practical limits in the length of the drum. The number of times each contact can be actuated during a revolution of the drum to connect the resistors in various torque-controlling circuits is limited by both the diameter of the drum and the minimum rotation of the drum necessary to open or close a contact.

Further expense is encountered in these conventional systems in protecting contacts from arcing due to transients generated when these contacts interrupt the current flow in the motor circuit.

It is thus an object of this invention to provide a motor control system wherein generated tractive effort can be accurately controlled with either one or a suitably small number of armature series resistors.

It is an object of this invention to provide a motor control system which controls the generated tractive effort of motors having a series-connected field windings by gradually varying the series field strength independently of armature current.

It is another object of this invention to provide a mechanically simplified motor control system which allows accurate and smooth control of motor tractive effort during both propulsion and braking.

In one system which attempts to control motor torque without using armature resistors, a control circuit periodically blocks the flow of current from an inductive source, such as the third rail of an electrical railway system, to direct-current motors. In this manner the control circuit varies the average armature current of the direct-current motors from start-up to full speed. A brief description of such a system begins on page 167 of the General Electric Silicon Controlled Rectifier Manual, third edition, 1964, and is intended to be incorporated herein by reference. While the use of this series-connected control circuit eliminates the need for a large number of armature resistors, the control circuit itself abruptly changes the entire current flow through the direct-current motors as it periodically blocks the flow of this current. Thus a large inductive reactor and free wheeling diodes are required to limit motor current ripple. Furthermore, since conventional armature resistors are completely eliminated, the total voltage of the source is alternately applied across this control circuit and the remaining portion of the motor circuit. Thus, the components used in the control circuit must have a high voltage rating to withstand the total voltage of the source and transient overvoltages which occur from time to time. Line breakers or fuses which protect the motors from damage caused by control circuit failure must react at a high speed to prevent the rapid build-up of excessive armature current since there is only a limited reactance available to affect this current.

It is still a further object of this invention to provide a motor control system which eliminates both the need for a large number of armature resistors and the need for a large inductive reactor to limit motor current ripple.

It is a further object of this invention to provide a direct-current motor control system in which the inductive reactance of a power source aids in attenuating transient voltages which are applied to control circuits in the system.

Briefly stated, and in accordance with one aspect of this invention, these objects are accomplished through the use of a current diverter which controls the value of the armature series resistance and/or the motor field excitation of a control motor or motors by alternately shunting a high level of current and a low level of current from an armature resistor or from a field excitation circuit. Means are provided for progressively varying the time ratio between the occurrence of the high level of shunting and the occurrence of the low level of shunting to gradually vary the motor field excitation or armature series resistance.

Where two or more series resistors are used in the control system, the armature series resistance is still varied by the effects of a single diverter on a resistor it shunts. When another resistor is added to or subtracted from the circuit, this diverter simultaneously changes the effective resistive value of the resistor it shunts so that the series armature resistance has not changed as a result of the addition or substraction.

In achieving a full range of acceleration and braking control of the controlled motors, various novel means are provided for synchronizing the shunting action of the diverter with the switching action of various switches in the armature and field circuits. As a result, smooth and fully controlled acceleration and braking are provided over the full operating range of a motor.

As used throughout the specification and the claims, the term "current diverter" refers to any type of circuit or device which can be controlled to divert or shunt either a high level or percentage of the total current flowing through a shunted circuit or circuit component away from this circuit or component, or shunt a low level or percentage of this current, preferably zero current, away from this circuit or component. Typically, the current diverter provides a low resistance path, preferably approaching zero resistance, across the circuit or component, while shunting the high level of current. It provides a high resistance path, preferably approaching an infinite resistance, across this circuit or component while shunting the low level of current. By way of illustration only, the diverter circuit of the preferred embodiment of this invention includes controlled rectifiers which can be fired to provide a low resistance path or remain in an unfired condition to provide a high resistance path.

To determine the time ratio of, say, the occurrence of the high level of shunting with respect to the occurrence of the low level of shunting during any period of time, the duration of the high level of shunting in this period of time is divided by the duration of the low level of shunting in this period of time.

The specification concludes with claims particularly pointing out and distinctly claiming the subject matter of this invention. The organization and manner and process of making and using this invention, together with further objects and advantages thereof, may be best understood by a reference to the following description taken in conjunction with the accompanying drawings:

Description of the drawings

FIG. 1 is a schematic diagram of a motor power circuit used in accordance with one embodiment of this invention;

FIG. 2 shows the manner in which FIGS. 3-9 should be grouped together to make up a single schematic diagram of the control circuits used in accordance with this invention;

FIG. 3 is a schematic diagram of control circuits which determine whether the controlled motors operate in a propulsion mode or a braking mode;

Figure 4:
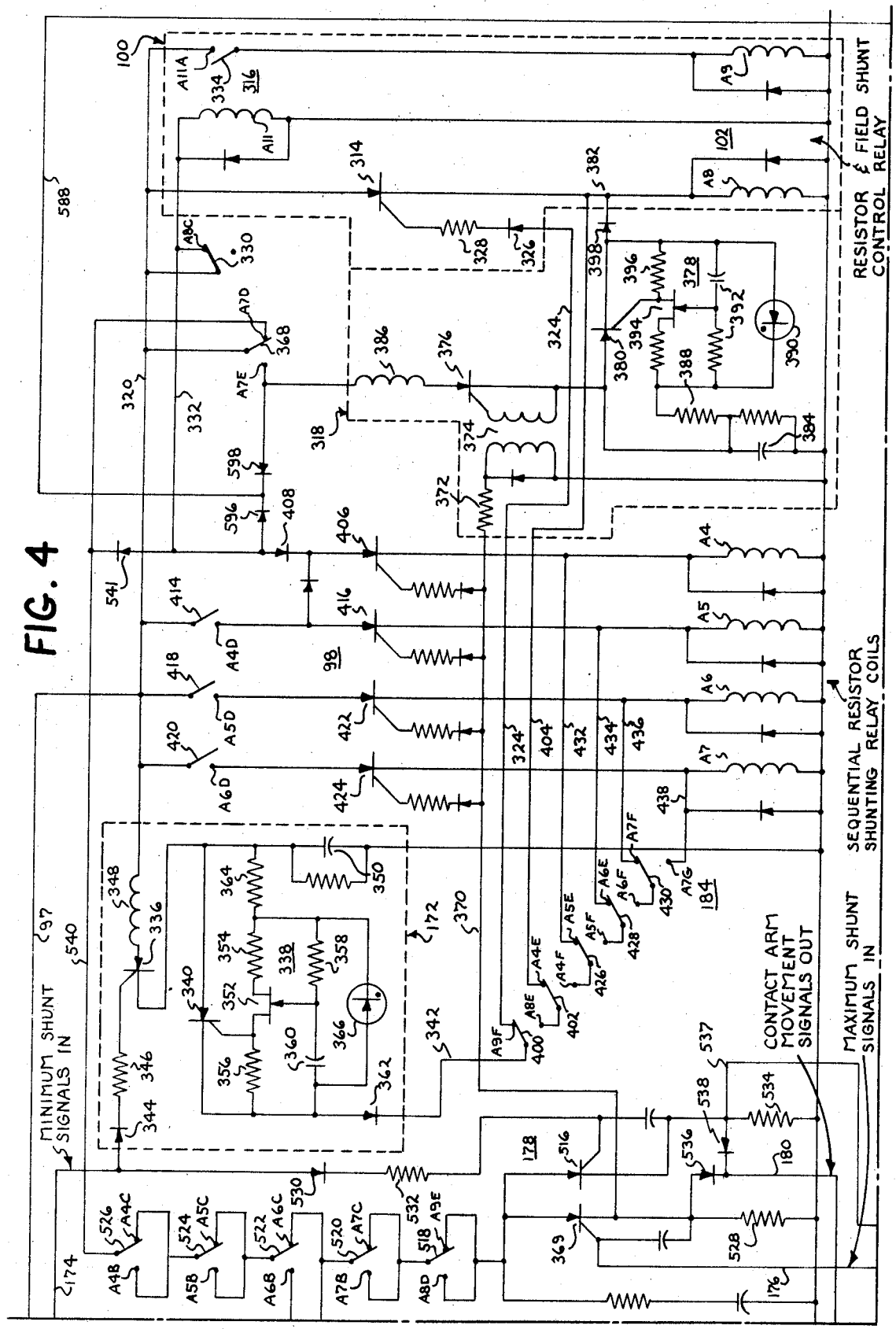
FIG. 4 is a schematic diagram of control circuits which determine the position of various contact arms in the power circuit of FIG. 1 and respond to the movement of these arms.

The motor control system of this invention can control both propulsion, or the generation of positive torque or tractive effort, and braking, or the generation of negative torque or tractive effort or control either one of these, such as propulsion, alone. In order to simplify the description of this system, its application to propulsion control is described, with a description of its application to braking control added where the functions of the components involved vary for propulsion and braking.

Each pair of contacts of the electromechanical switches or relays includes in the illustrated embodiment of this invention is shown, for the sake of convenience, to include a stationary member, or contact, and a movable member, or contact arm. The electromechanical switches may, as an alternative, include a pair of movable members. The contact arm of each pair of contacts is shown in the position it is in after being de-energized following a braking cycle which has progressed to a full stop. It is contemplated that those skilled in the art can substitute static switches, such as semiconductor switching devices, for the electromechanical switches shown in the illustrated embodiment, while still retaining the functions performed in accordance with this invention by the electromechanical switches. Each relay coil is designed by a prefix letter A followed by a number assigned to this coil. Each stationary contact forming a part of a relay is marked with the letter A and the number assigned to the relay coil which controls a contact arm associated with the contact, followed by a letter identifying that particular contact.

The control system of this invention is described with respect to direct-current, series field, traction motor control where it has been found to be particularly advantageous. However, it is contemplated that many of the features of this invention can be applied by those skilled in the art to the control of alternating-current motors and to the control of various other types of direct-current motors as well.

Means are provided for controlling the operation of current diverter means which can alternately shunt a high level of current and a low level of current from either a motor field circuit or a series armature resistor of one or more controlled motors. The torque or tractive effort produced by the controlled motors during either propulsion control or dynamic braking control, or both, is controlled by progressively varying the time ratio between occurrence of the high level of diverter shunting and the occurrence of the low level of diverter shunting. In the illustrated embodiment of this invention this time ratio is controlled by progressively advancing or retarding the occurrence of the high level of diverter shunting in successive timing cycles, and the remaining portion of the specification refers to this mode of operation. The duration of the timing cycles may be determined by the frequency of an alternating-current power source, where the control system is of the A-C type, or they may be determined by the frequency of an oscillator included in the system itself, as shown in the illustrated embodiment. As an alternative, it is contemplated that for some applications of this invention the frequency of an oscillator contained by the system may be varied to control the time ratio between the high level of shunting and the low level of shunting.

Means are provided for opening and closing the armature circuits, for reversing the connections of motor windings for generating torque in a required direction, and for switching between diverter field circuit shunting and diverter armature resistor shunting, all in a sequence at the start of propulsion and braking which minimizes problems such as contact arcing and the like, caused by high currents during switching.

Means are also provided for setting up initial operating conditions for the control circuits to prevent malfunctions at the start of propulsion and braking. For example, when the armature circuit is being closed as a contact arm moves toward connecting the armature windings to a power source at the start of propulsion, signal generators which control the advancing and retarding of diverter shunting are held off temporarily to allow time for charging energy storage means included in commutating circuits of the current diverter means. Again, as the armature circuit is being switched to the closed position, these signal generators receive control signals which cause them to assume prescribed initial operating states when they begin operation. For example, when a propulsion cycle begins with controlling field shunting, the control signals cause the occurrence of the high level of diverter shunting to be fully advanced at the start of propulsion. Furthermore, means are provided for temporarily inactivating, at the start of propulsion and braking, circuits which initiate changes between diverter field and resistor shunting and/or which initiate the subtraction of armature resistors from the armature circuit or their addition to the armature circuit in response to preselected states of advanced and retarded diverter shunting.

During a field shunting portion of a control cycle, which can occur at both start-up and high speeds during propulsion and at high speeds during braking, the current diverter means connects a first impedance of a field shunting circuit across the field circuit through a low impedance path for progressively varying portions of successive timing cycles to change the excitation of the field windings independently of the armature current level. The resistance of a second impedance of the field shunting circuit is substantially larger than the resistance of the field circuit. To allow adequate control over the field excitation, the resistance of the first impedance means can be in the range of from about one-fifth to about twice the resistance of the shunted field circuit. The first impedance means can comprise an inductive reactor which limits the ripple caused by the occurrence of the high level of current shunting during successive timing cycles.

During the armature resistor shunting portion of a propulsion cycle, for example, the torque is increased or maintained by increasing the voltage applied to the motor armature windings by the armature circuit. To this end, the occurrence of the high level of diverter shunting is progressively advanced during successive timing cycles so that the armature resistor is shunted for increasingly larger percentages of successive timing cycles. The time ratio of the occurrence of this high level of shunting with respect to the low level of shunting is thus increased.

Means are provided for programming a maximum rate at which the regulated parameter can be increased or decreased. This maximum rate limits the response rate of the control system to requests for an increase (or decrease) in the output torque of the controlled motors and limits the rate at which the control system acts to maintain a selected output torque as motor speed increases.

The effective resistance of the shunted armature resistor, that is the average resistance of the combination of this resistor and the current diverter over a time period such as a single timing cycle, is gradually decreased in this manner.

In accordance with a principal feature of this invention, a control system of this type should include a plurality of armature resistors, and means should be provided for sequentially removing these armature resistors from the armature circuit each time the effective resistance of the shunted resistor has been decreased by an amount equal to the resistance of the next resistor to be removed in the sequence. Simultaneously with the removal of this resistor, as by shunting it with a contact arm of an electromechanical switch or with a semiconductor switch, the occurrence of high level diverter shunting is retarded to increase the effective resistance of the shunted resistor by an amount approximately equal to the resistance of the eliminated resistor. Therefore, armature resistors are removed from the armature circuit without causing a substantial change in the series armature resistance due to their removal. Each time one of the armature resistors is removed, a single diverter can progressively apply another portion of the source voltage to the armature windings. This mode of operation allows a single controlled current diverter and a number of switches to vary the series armature resistance in a gradual manner. The switch need only have the ability to be opened or closed, while the duration of alternate high levels of shunting and low levels of shunting is controlled for the single current diverter.

Means are further provided for compensating for numerous lags in the motor control system. A lead network responds to the controlled parameter of the controlled motor, such as the armature current, to adjust the occurrence of the high level of diverter shunting as a function of the rate of change of this parameter.

The occurrence of diverter shunting during a timing cycle is synchronized with the end of the preceding timing cycle. Where the current diverter includes controlled rectifying devices, means are provided for preventing the current diverter from being actuated at the start of any single timing cycle until the energy storage means in the diverter commutating circuit is substantially fully charged. The diverter circuit may be of the type in which the energy storage means can be charged to a voltage level proportional to the level of the voltage developed across the controlled rectifying means while they are non-conducting.

General description of power circuit

FIG. 1 discloses a motor power circuit including a current diverter circuit 30 which varies the tractive effort produced by direct-current motor means, represented by armature windings 32 and 34, by varying the excitation of their field windings 36 and 38, respectively, and/or by varying the resistance of armature series resistors 39. Generally speaking, the current diverter circuit 30 shunts a high level of current away from the field windings 36 and 38 or from one of the armature resistors 39 for controllable portions of timing cycles generated for the motor control system. The average current flow through a diverter-shunted field winding or armature resistor is varied as the firing of controlled rectifiers in the diverter 30 is progressively retarded or advanced during successive timing cycles so that the diverter 30 shunts the high level of current from field winding or armature resistor for progressively lesser or greater portions, respectively, of successive timing cycles. The motor control system of this invention comprises a number of circuits which allow the diverter to vary the field excitation and the armature series resistance to provide controlled variations in generated tractive effort.

While this invention is not limited to use of any one type of diverter circuit, the illustrated diverter circuit 30 is one type which can be used, basically comprising controlled rectifiers 74 and commutating energy storage means 84. If their anodes are positive with respect to their cathodes, the controlled rectifiers 74 switch to a low impedance state when firing pulses are applied to terminals 76 and 78. These forward biased controlled rectifiers are commutated when commutating pulses applied to terminals 80 and 82 discharge the energy storage means 84.

As one feature of this invention, the energy storage means 84 is periodically charged and discharged at the timing cycle frequency, whether torque is being developed by the controlled motors or not, as long as the motor control circuits are energized. Means can be provided for detecting prior to energizing the controlled motors, that this energy storage means is being charged and discharged thereby testing the integrity of the commutation circuit. This can prevent a commutation failure of the controlled rectifiers 74 by indicating whether or not the commutation circuit has malfunctioned.

As another feature of this invention, the various functions performed by the control circuits of the motor control system of this invention, particularly those performed at the beginning of propulsion or braking, have a preselected sequence which achieves a full range of acceleration (or deceleration) control over the controlled motors, while minimizing arcing between contacts and contact arms and minimizing abrupt changes in the generated tractive effort.

Generally speaking, the controlled motors are energized for propulsion when a source of power at terminals 40 and 42 is connected across the motor armatures 32 and 34 and the field windings 36 and 38. However, control circuits must prepare the power circuit for propulsion before power is applied to the controlled motors.

Where dynamic braking is provided for the controlled motors, the motor control system includes means for first opening a dynamic braking circuit which had been used to stop the controlled vehicle. This is accomplished by causing the contact arm 44 to break contact with a contact A10A.

Means are provided for unshunting the armature series resistors 39 after the dynamic braking circuit has been opened. The last-mentioned means assures that the contact arms 46, 48, and 50 break contact with contacts A4A, A5A and A6A to unshunt armature resistors 54, 56 and 58, respectively.

The power circuit includes means which cause the controlled motors to propel a vehicle in a desired direction when the propulsion circuit is closed. In the illustrated embodiment these means include a pair of single-pole, double throw switches comprising contact arms 64 and 66 which reverse the connection of the armatures 32 and 34 for propulsion from the connection required for dynamic braking. Thus, after the dynamic braking circuit is opened, the contact arms 64 and 66 are switched from the terminals A3A and A3B to the terminals A2A and A2B, respectively. For the sake of simplicity, the illustrated embodiment does not show separate means for controlling the contactors 64 and 66 to reverse the direction of propulsion, as by providing additional control apparatus for the contact arms 64 and 66, which means can easily be provided by those skilled in the art.

Means are also provided for connecting the current diverter circuit 30 for either field winding shunting or resistor shunting, as required at the beginning of a particular propulsion cycle. In the illustrated embodiment, when a propulsion cycle is begun while the controlled motors are at stand-still or at a very low speed, contact arms 68 and 70 connect the diverter circuit 30 through contacts A9A and A9B, respectively, to a field-shunting circuit 72 to vary the field excitation of the field windings 36 and 38. It is this circuit 72, having a diverter-shunted resistor with a resistance substantially greater than the resistance of the field circuit, which allows the diverter to shunt current from the field windings without abruptly starting and stopping the field current flow and without incurring interference from power circuit transients. Accurate, smooth control of field excitation, heretofore available only through the use of a separate field-exciting generator, is thus available through the use of the diverter circuit 30 and a circuit such as the RL circuit 72. Resistor shunting occurs when the contact arms 68 and 70 connect the diverter circuit 30 through terminals A8A and A8B, respectively, to the resistor 60.

In further accordance with this invention, initial operating conditions must be set up for the current diverter circuit 30 before power is applied to the power circuit. For example, to prevent an unsuccessful attempt to commutate the controlled rectifiers 74, means are provided for assuring that the energy storage means 84 is sufficiently charged for commutation before firing pulses or commutating pulses are applied to the diverter circuit 30. Furthermore, the diverter circuit 30 must assume a prescribed initial operating condition which limits the initial generated tractive effort as propulsion is entered into. In the illustrated embodiment the firing of the controlled rectifiers 74 in the diverter circuit 30 is fully advanced, that is, the diverter shunts the field windings 36 and 38 for a preselected maximum percentage of a timing cycle to allow only a minimum excitation of the field windings.

Means are also provided for completing the propulsion circuit once the foregoing functions have been performed. At this time in the propulsion acceleration sequence a contact arm 86 must make contact with the terminal A1A to connect the power source at the terminals 40 and 42 across the armature windings 32 and 34 and the field windings 36 and 38.

Once the armature circuit is completed, the tractive effort is regulated in response to controlled variable motor parameters such as the armature current and armature voltage sensed by means 88. As pointed out above, the diverter circuit 30 first limits the excitation of the field windings 36 and 38 to a preselected minimum. It then allows the excitation to be progressively increased during successive timing cycles of the motor control system. The rate of increase in the excitation and thereby rate of increase in torque can be controlled until a desired tractive effort level has been reached or until full field current has been reached.

Once the field windings 36 and 38 are undergoing a maximum excitation, the diverter circuit 30 is connected through contacts A8A and A8B to the armature resistor 60. Thereafter, the generated tractive effort is controlled by gradually decreasing the armature series resistance, by initially fully retarding the firing of the controlled rectifiers 74 and thereafter progressively advancing their firing point during successive timing cycles. When the effective resistive value of the resistor 60 is decreased by an amount equal to the resistance of the resistor 54, the contact arm 46 engages the contact A4A to short out the resistor 54, and the firing of the controlled rectifiers 74 is simultaneously fully retarded once again. Thus, resistor 60 is substituted for the resistor 54 in a manner which does not change the resistance of the armature circuit and thus does not cause a change in the tractive effort generated by the motor control system.

Similarly, the resistors 56, 58 and 60 can be shunted out of the armature circuit to further increase or to maintain the generated tractive effort as speed increases. Thereafter, at higher motor speeds the diverter circuit 30 is reconnected to the field shunting circuit 72 to progressively decrease the field excitation and thereby maintain or further increase or control the generated tractive effort. Means are further provided for reversing the resistor shunting sequence outlined above, thereby decreasing the generated tractive effort without going into braking. The motor control system of this invention thus regulates the generated tractive effort of direct-current motors from standstill to a maximum speed or at any desired speed inbetween.

General description of control circuits

To facilitate the gaining of an understanding of this invention, FIGS. 3 through 9 inclusive, containing control circuits for the power circuit shown in FIG. 1, should be grouped together as shown in FIG. 2 to make up a single schematic diagram, which will be referred to along with FIG. 1, during the following description of the control system. The control circuits in this schematic diagram will be initially discussed in the order in which they perform their various functions whenever this is practical.

Referring now to FIG. 3, means are provided for determining whether the motor control system is to operate in a propulsion mode or a braking mode. These means are conveniently shown as a group of manually controlled switches 90 operatively connected to a switch handle 92 which can be moved in the direction of an arrow marked "propulsion" to provide propulsion control or in the direction of an arrow marked "braking" to provide braking control.

Means are provided for opening the dynamic braking circuit (removing the contact arm 44 from the contact A10A in FIG. 1) at the beginning of a propulsion cycle after the switch handle 92 is moved in the direction of the arrow marked "propulsion." In the illustrated embodiment, a relay coil A10 in FIG. 3 is de-energized for this purpose when a contact arm 91 is moved from contact 93 to contact 95.

To assure that the armature resistors 54, 56 and 58 of FIG. 1 are unshunted after the dynamic braking circuit is opened, means including a contact arm 94 of the switches 90 temporarily remove power supplied at a contact 96 from a conductor 97 and thus remove power from the anodes of a plurality of controlled rectifying devices 98 in FIG. 4. This temporary removal of power turns off the rectifying devices 98, de-energizing the relay coils A4, A5 and A6, thereby opening the contact arms 46, 48 and 50 (in FIG. 1) if they are closed, or otherwise preventing these contact arms from making contact with their respective contacts.

FIG. 4 also includes means for controlling whether the current diverter circuit 30, in FIG. 1, is connected for resistance shunting or field shunting. The last-mentioned means comprises a circuit 100 including a double throw relay 102, which may be of the over-center, toggle type, which retains the last of its two positions to which it is set, even after it is de-energized or if both coils A8 and A9 are simultaneously energized. Suffice it to say at present that if relay coil A8, which causes the diverter circuit 30 to be connected for resistor shunting, is the last of coils A8 and A9 to be singly energized during braking, at the start of propulsion from standstill relay coil A9 must be at least momentarily energized to connect the diverter circuit 30 for field shunting.

Referring once again to FIG. 3, means including a double throw relay 103 determine the armature connections and the direction in which tractive effort produced by the controlled motors of FIG. 1 is exerted. The relay 103, which like the relay 102, may be of the over-center, toggle type, also retains the last of its two positions to which it is set until it is energized to the other position. Assuming as above that the motor control system of this invention provides propulsion only in a single direction, the relay coil A2 is energized to connect the armature windings 32 and 34 through the terminals A2A and A2B during propulsion. The relay coil A3 is energized at the beginning of braking to reverse the direction of current through these armatures.

The initial conditions for controlling the diverter circuit 30 of FIG. 1 are set up at the beginning of a propulsion (or braking) cycle in response to signals from a circuit 104 in FIG. 3. After the manually operated switches 90 are moved to their "propulsion" position, signals from the circuit 104 are coupled through a conductor 106 to pulse producing means 108 in FIG. 5 to arm it. In response to the termination of these signals as the armature circuit is being closed, a pulse from pulse producing means 108 causes maximum field shunting (and thus a minimum field excitation) by fully advancing the firing of the controlled rectifiers 74 at the beginning of a propulsion cycle. The rate of decay of the pulse produced by means 108 controls the maximum rate at which field shunting progressively decreases during successive timing cycles after start-up and thus controls the maximum rate at which the field excitation can increase. In this manner the pulse producing means 108 provides a gradual build-up of tractive effort at the beginning of propulsion.

Figure 5:
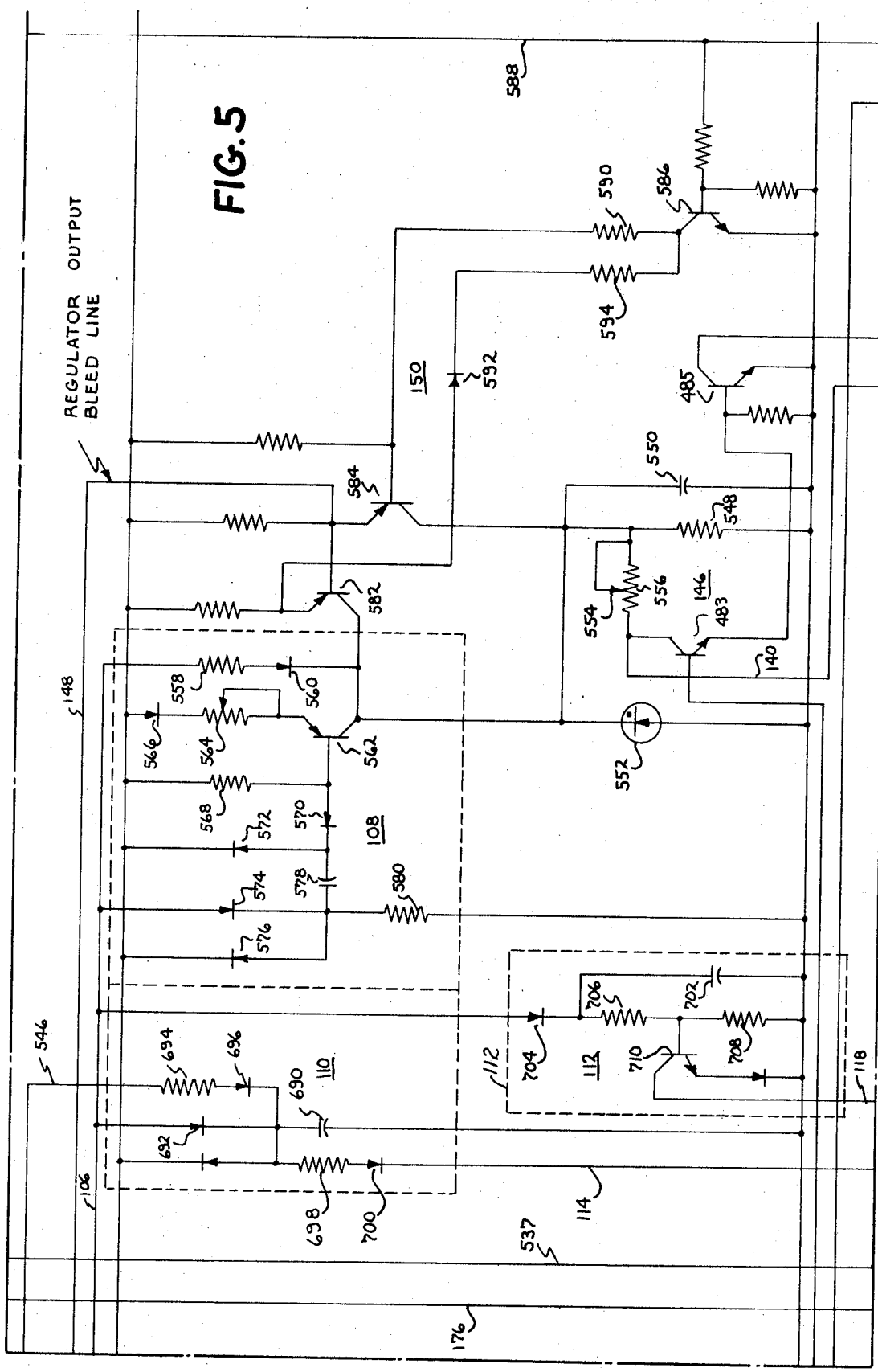
FIG. 5 is a schematic diagram of control circuits which aid in controlling the generation of firing signals for a diverter circuit of FIG. 1.

In further response to the signals from circuit 104 of FIG. 3, for some preselected time after contact A1B has been closed and propulsion has begun, time delay circuits 110 and 112 in FIG. 5 prevent the diverter circuit 30 of FIG. 1 from being inadvertently switched from field shunting to resistance shunting and prevent the armature resistors 39 of FIG. 1 from being inadvertently shunted. Suffice it to say that a pulse coupled from the circuit 110 and through a conductor 114 locks out or renders inoperative a signal generator 116 in FIG. 6 which generates signals in response to a fully advanced shunting condition when the diverter circuit 30 achieves shunting for a preselected maximum percentage of a timing cycle. A pulse coupled from the circuit 112 and through conductor 118 locks out or renders ineffective a signal generator 120 in FIG. 6 which generates signals in response to a fully retarded shunting condition when the diverter circuit 30 is shunting for zero or a preselected minimum percentage of a timing cycle. Thus for a time after propulsion has begun, the signal generators 116 and 120 cannot generate signals which could cause a malfunction to occur.

Figure 6:
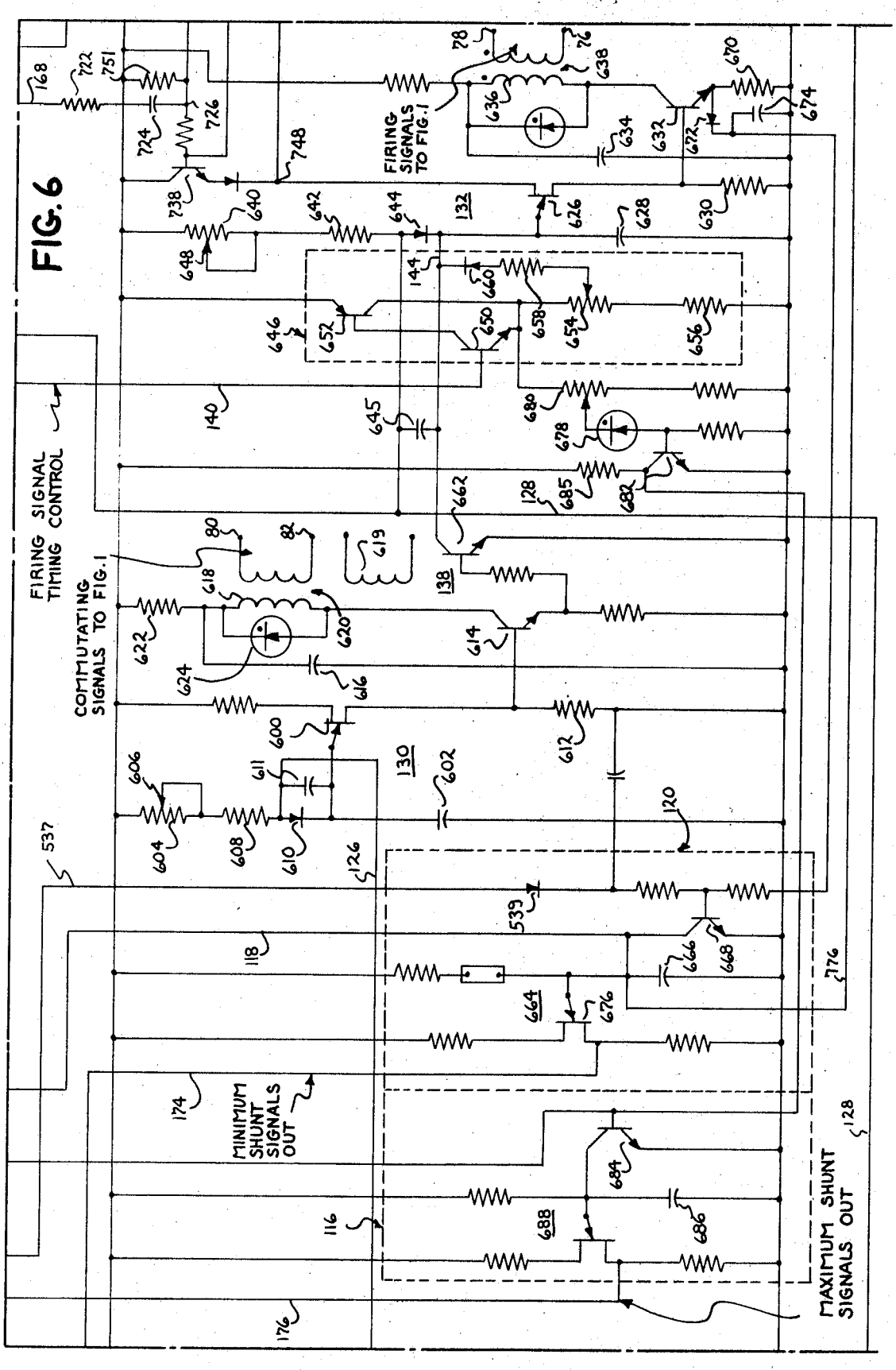
FIG. 6 is a schematic diagram of commutation and firing signal generators and control circuits which respond to advanced and retarded generation of firing signals.
Figure 7:
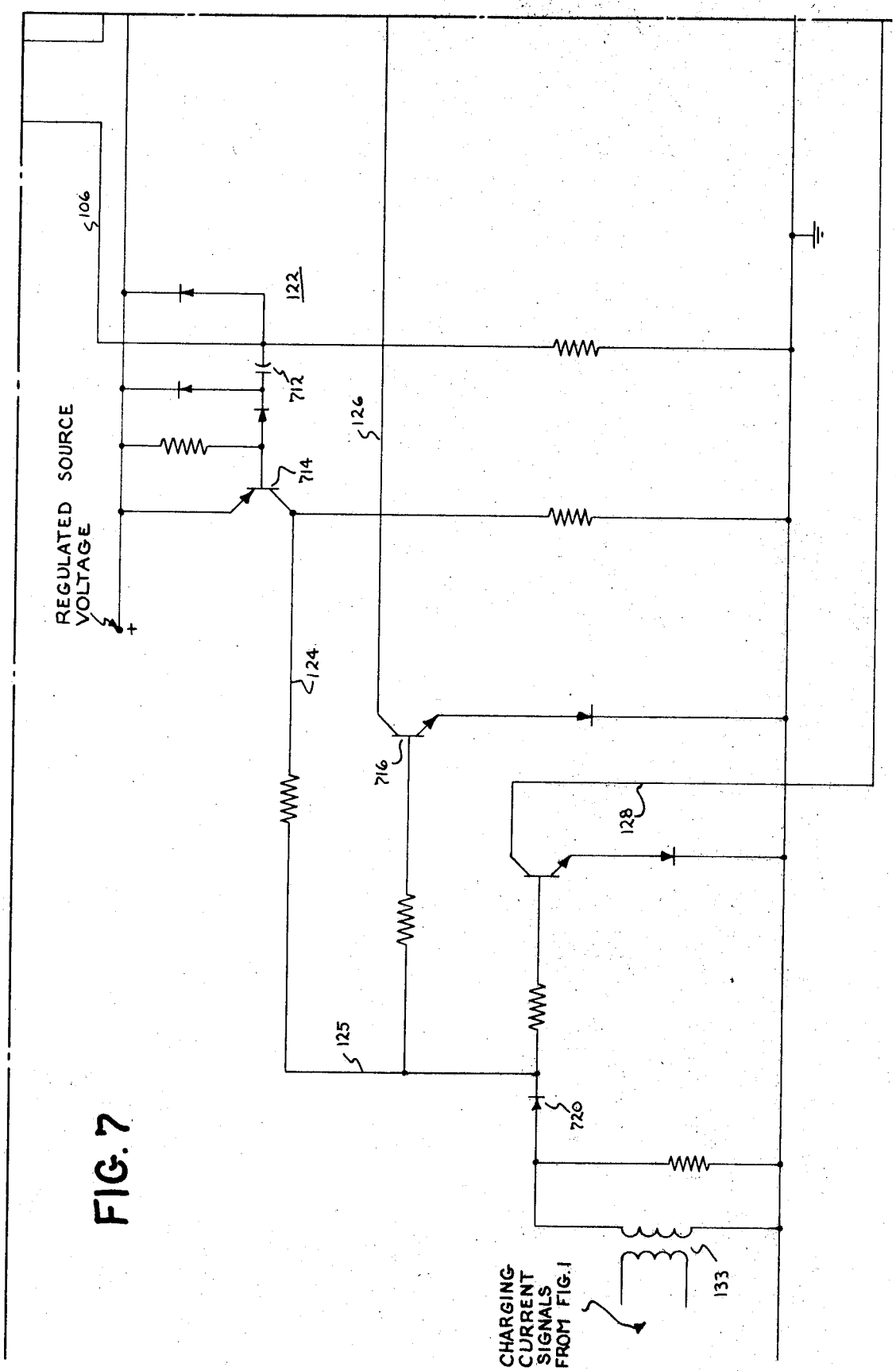
FIG. 7 is a schematic diagram of control circuits which allow a commutation energy source of FIG. 1 to fully charge.

Control circuits shown in FIG. 7 prevent the diverter circuit 30 of FIG. 1 from being turned on in any manner until the energy storage means 84 is fully charged, assuring that this energy storage means can complete any attempted commutation of the controlled rectifiers 74. This is accomplished by preventing firing signals and commutating signals from being generated under preselected conditions. At the beginning of a propulsion cycle, for example, signals produced by the circuit 104 in FIG. 3 are coupled through the conductor 106 to charge a pulse producing circuit 122 of FIG. 7, preparing it to generate a pulse at the cessation of voltage on conductor 106. As long as this pulse remains at a conductor 124 at the output of the pulse circuit 122, signals at conductors 126 and 128 hold off a free-running oscillator 130, shown in FIG. 6, which normally determines the end of each timing cycle, and a pulse at the conductor 124 also holds off an oscillator 132 which normally generates firing signals for the controlled rectifiers 74.

Similarly, the oscillators 130 and 132 of FIG. 6 cannot actuate the diverter circuit 30 at the beginning of any timing cycle as long as a reactor 133, having a primary winding in FIG. 1 and a secondary winding in FIG. 7, senses that the energy storage means 84 in FIG. 1 is still being charged by a rising voltage at the contact arms 68 and 70. While the charging current in the primary winding of this reactor is large enough to produce a secondary winding voltage which forward biases the transistors in FIG. 7, the oscillators 130 and 132 are held off. When these transistors are no longer forward biased, the energy storage means 84 is substantially fully charged and the oscillators 130 and 132 can turn on.

Allowing the energy storage means 84 in FIG. 1 to be substantially fully charged before turning on the diverter circuit 30 prevents a commutating malfunction from occuring, as might be the case should the energy storage means 84 attempt to commutate the controlled rectifiers 74 with insufficient energy to complete the commutation.

Often in the past, energy storage means in diverter type circuits have been overdesigned for the needs of normal circuit operation to cope with transient supply voltages which raise the current level of controlled rectifiers that they must commutate substantially above the normal level. That is, the energy storage means were charged each time as if the controlled rectifiers were carrying the highest anticipated current. One significant advantage of this invention is that the expensive overdesign is not necessary. The energy storage means 84 is charged to the larger of a predetermined energy level and an energy level corresponding to the voltage level (normal or transient) across the nonconducting controlled rectifiers 74. The larger of these energy levels is, with significantly less overdesign, sufficient to commutate the controlled rectifiers 74 after they are next fired. If the voltage level across the nonconducting controlled rectifiers 74 is below the normal range, say at the start of braking with a low brake rate, the predetermined energy level to which the energy storage means 84 is charged is sufficient to commutate the controlled rectifiers 74. However, when the normal voltage level is reached or if there is a rising transient voltage present, the stored energy level is increased above the predetermined level and firing of controlled rectifiers is prevented until the transient rise ceases. The energy storage means 84 is now charged to such a level that it can commutate the controlled rectifiers 74 at the resulting increased current.

Referring once again to FIG. 3, means are included for closing the propulsion circuit in FIG. 1 after the foregoing functions have been performed in the control circuits. In the illustrated embodiment, a contact arm 264, responsive to the energization of relay coil A2, makes contact with a contact A2C to energize a relay coil A1, which in turn causes the contact arm 86 in FIG. 1 to make contact with the contact A1A. The power source at the terminals 40 and 42 in FIG. 1 is now connected across the armature windings 32 and 34 and the field windings 36 and 38 to energize the controlled motors.

In accordance with this invention, means are provided for responding to the connection of the power source at the terminals 40 and 42 to the motor armature circuit for allowing the circuits 108, 110 and 112 in FIG. 5 and circuit 122 in FIG. 7 to perform their individual functions at the beginning of propulsion. In the present embodiment of this invention a normally-closed contact arm 136 is actuated to disengage from the contact A1B as the contact arm 86 in FIG. 1 is about to make contact with the contact A1A. That is, as the contact arm 86 is moving toward the contact A1B and just before it makes contact with this contact, the circuits 108, 110, 112 and 122 are actuated by the termination of the signals at conductor 106. Thereafter, the oscillator 130 in FIG. 6 determines the end of each timing cycle by generating a commutating signal which is coupled to terminals 80 and 82 to discharge the energy storage means 84 of diverter 30.

Means in FIG. 6, including a synchronizing circuit 138, assure that the firing signals generated by the oscillator 132 are synchronized with the generation of the commutating signals which occur at the end of each timing cycle. In the illustrated embodiment, the oscillator 132 generates a firing signal at the terminals 76 and 78 of FIG. 1 at some variable and controllable time interval after a commutating signal is generated. Generally speaking, the signal level at a conductor 140 of FIGS. 5 and 6 determines the length of this time interval, along with a ripple signal-responsive circuit described below. Increasing the signal level at the conductor 140 raises the control signal level at a conductor 144 and thereby shortens this time interval, that is, advances the firing of the controlled rectifiers 74 in the timing cycles. Decreasing the signal level at the conductor 140 has the opposite effect: it lengthens the aforesaid time interval by retarding the firing of the controlled rectifiers 74.

The signal level at the conductor 140 is in turn determined by a circuit 146, in FIG. 5, in response to signals from circuits including the pulse circuit 108 and mode control circuit 150. The latter circuit determines whether the output signals of a regulator in FIG. 8 (received through conductor 148) increase or decrease the signal level at the conductor 140. A pulse from the circuit 108 controls field shunting at the beginning of propulsion. Thereafter, current bled through the conductor 148 controls both resistor and field shunting during propulsion.

Figure 8:
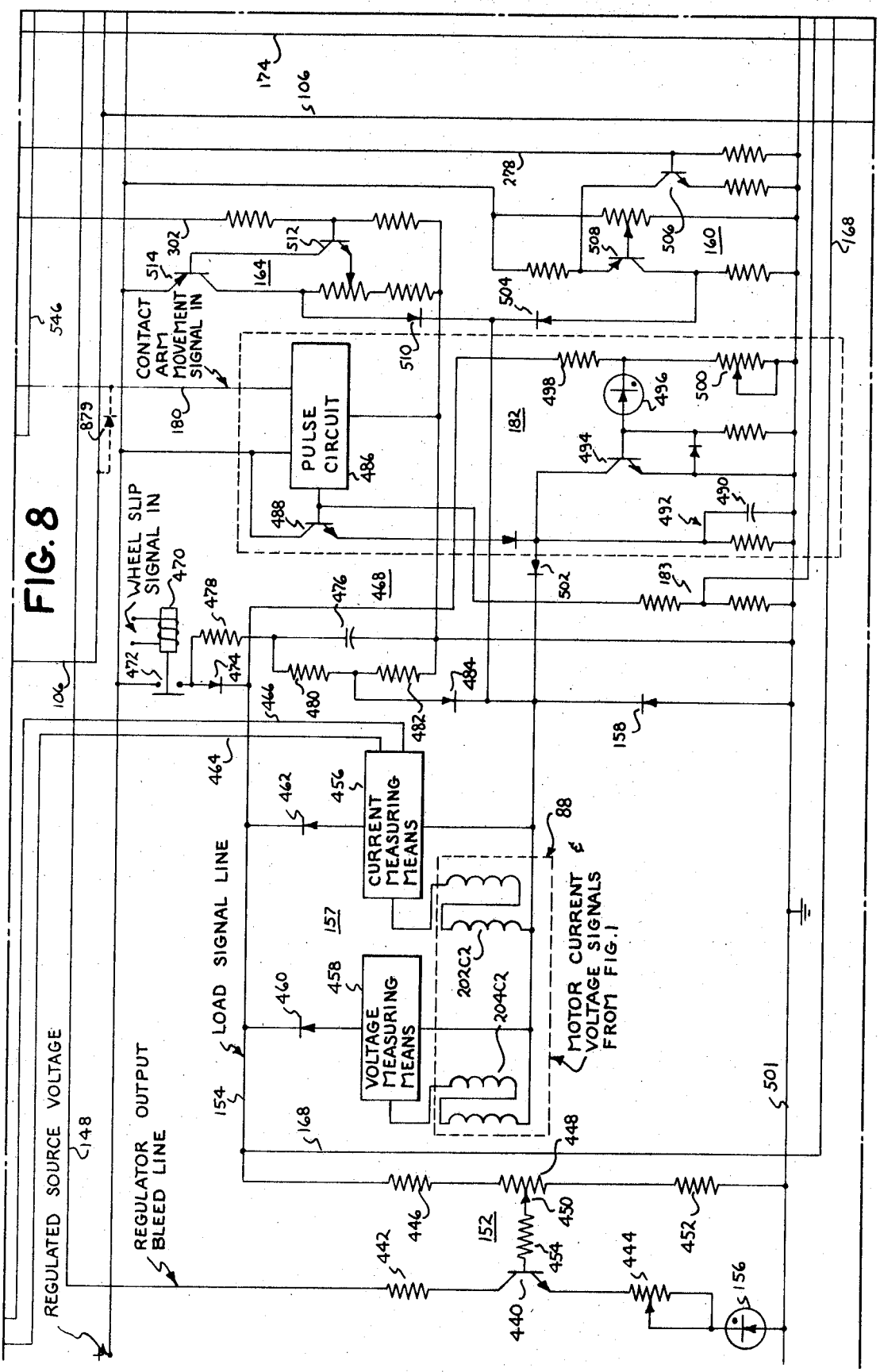
FIG. 8 is a schematic diagram of a regulator circuit used to control motor torque.

The regulator circuit of FIG. 8 basically comprises means 152 for comparing the voltage level at a load signal line 154 with a reference voltage level, such as that established by a breakdown voltage device 156 in the illustrated embodiment. When the voltage at the load signal line 154 reaches a predetermined nominal level, current is drawn through the conductor 148 (from the mode control circuit 150 in FIG. 5) to vary the firing signal timing control voltage at conductor 140 in FIGS. 5 and 6.

The voltage at the load signal line 154 is made up of a first voltage proportional to a controlled variable parameter of the controlled motors and an open loop voltage. The first voltage is produced by means 157 and has a level proportional to the armature current level of the controlled motors or the voltage level across their armatures.

The remaining portion of FIG. 8 develops the open loop signal across a summing diode 158. At the occurrence of an event, such as vehicle wheel slip or the shorting out of one of the armature resistors 39 in FIG. 1, the voltage across the diode 158 is raised to a level such that the sum of it and the output of means 157 reaches the perselected nominal signal level of the load signal line 154. Current is then drawn through the conductor 148 to limit the firing signal timing control voltage level. The open loop signal decays at a predetermined rate after each event, allowing the armature current or the armature voltage to increase with a maximum rate of increase of this same rate, so that their sum remains at the nominal signal level. Normal regulation action continues through this process. Propulsion limiting circuits 160 (in FIG. 8) and 162 (in FIG. 3) determine the maximum tractive effort permitted to be developed during propulsion, while braking limit circuits 164 and 166 perform the same function during braking. Once the maximum tractive effort level is reached, the regulator can maintain it with further increases in motor speed.

The motor control system of this invention includes many phase lags caused by the inductive nature of the motor load and by filters which attempt to remove the high ripple content of the signal voltage derived from, say the armature current, caused by controlling the tractive effort at the timing cycle frequency. To introduce a compensating phase lead into the system, and thereby prevent unstable oscillation or hunting, a conductor 168 connects the load signal line 154 through a derivative network included in a synchronized stabilizing circuit 170, shown in FIGS. 6 and 9. During the resistor shunting portion of a propulsion cycle, for example, the stabilizing network 170 retards the generation of firing pulses as a function of the rate of increase of the load current and advances the generation of firing pulses as a function of the rate of decrease of the load current.

Referring once again to FIG. 4, means are provided for switching the diverter circuit 30 (of FIG. 1) to resistance shunting after the field windings are fully excited at the beginning of a propulsion cycle. These means include a signal generator 172 which energizes relay coil A8 in circuit 100 in response to minimum shunting signals which are coupled to FIG. 4 through a conductor 174 at the time of achieving full field excitation. Means are also provided for sequentially shunting out the armature resistors 39, in FIG. 1. A separate one of these resistors is shunted out each time diverter circuit 30 decreases the effective resistance of the resistor 60 by an amount equal to the resistance of the next of the armature resistors 39 to be shunted in the preselected shunting sequence. To this end, in FIG. 4, the controlled rectifiers 98 sequentially energize the relay coils A4–A7 in response to maximum shunting signals produced by the generator 116 in FIG. 6 and coupled through conductor 176 to FIG. 4.

Circuit 178 of FIG. 4 provides pulses which control the shunting and unshunting of the series armature resistors in FIG. 1 and control changes between field and resistor shunting. When minimum or maximum shunt signals are received by the circuitry of FIG. 4, indicating that some change is required in the control of the armature circuit, a pulse from circuit 178 is used to energize the resistor and field control relay 102 or to energize the relay coils A4–A7. The pulse from circuit 178 is also coupled through a conductor 180 to means 182 (FIG. 8) for generating open loop signals to control increases in armature current when the armature current level is below regulation and for retarding the generation of firing signals by means of signals coupled to FIG. 5 from a voltage divider 183.

The presence of a voltage pulse at the conductor 180 merely preloads the means 182. The circuit 178 includes means for responding to the shunting and unshunting of the series armature resistors of FIG. 1 and to changes between resistor and field shunting, to actually begin the generation of the open loop signals and actually retard the generation of firing signals. In the present embodiment of this invention, the means referred to comprise contact arms which move to open the voltage supply to circuit 178 and thus terminate the generation of the voltage pulse by the circuit 178 as, for example, when a contact arm is moving toward a contact to shunt out a series armature resistor.

Means including contacts 184 and the signal generator 172 in FIG. 4 can reverse the field and resistor shunting sequence of the power circuit to decrease the generated tractive effort without going into braking.

Detailed description of power circuit

The power circuit shown in FIG. 1 includes a smoothing reactor 200 which, in conjunction with other inductances in this circuit, such as the armature windings 32 and 34 and the field windings 36 and 38 and the inductive source at the terminals 40 and 42 (for example, the third rail of a rapid transit system), determines the ripple content of the armature current. This smoothing reactor 200 must raise the total inductive reactance of the armature circuit to a value which limits the ripple in the armature current to no more than a maximum level. Since the motor control system of this invention is a constant current-type system, that is the diverter circuit 30 does not totally block the flow of armature current at any time, the inductive reactance of the source is in the armature current path at all times during the operation of this system to aid in decreasing the ripple content of the source armature current. This continuous presence of the source reactance in the armature circuit decreases the additional reactance needed to limit the ripple content of the armature current, thus decreasing the size of the reactor 200.

The circuit 88 includes a current-measuring reactor system 202 comprising a primary coil $202C_1$ and a secondary coil $202C_2$. The primary coil $202C_1$ is connected between the reactor 200 and the armature windings 32 and 34 to carry the armature current and allow the secondary coil $202C_2$ to provide current feedback signals for the regulator circuit in FIG. 8. A primary coil $204C_1$ of a current-measuring reactor system 204 is connected in series with a resistor 206 across the armature windings 32 and 34. The voltage across the resistor 206, and thus the current flow through the primary winding $204C_1$, is proportional to the armature voltage. The secondary winding $204C_2$ provides isolated feedback signals which are proportional to the armature voltages of the controlled motors. These well known reactor systems include an alternating-current voltage supply which enables a D-C current in the power circuit to be measured, while the power circuit is isolated from the measuring circuit.

In accordance with the broader aspects of this invention, the various control circuits of this motor control system allow the series armature resistance of the controlled motors to be gradually decreased by progressively advancing the firing of the controlled rectifiers 74 of the diverter 30 during successive timing cycles of the system. As the armature current is shunted around the resistor 60 by the conduction of controlled rectifiers 74 for progressively longer portions of the timing cycles, the effective resistance of this resistor is gradually decreased. When the effective resistance of the resistor 60 has been decreased by an amount equal to the resistance of one of the other armature resistors, say the resistor 54, the latter resistor is shunted by closing a contact arm associated therewith. Simultaneously, the firing of the controlled rectifiers 74 is fully retarded. Because the resistor 54 is replaced by an increase in the effective resistance of the resistor 60, there is no significant change in the series armature resistance when the resistor 54 is shunted.

The series armature resistance is further decreased by progressively advancing the firing of the controlled rectifiers 74 and then retarding it once again as the remaining armature resistors are shunted out of the circuit. Thus, a single current diverter 30 can be used to control the changes in the series armature resistance and thereby gradually change the generated tractive effort.

If each of the resistors 54, 56, 58 and 60 has an equal resistance, the fully advanced firing condition of the controlled rectifiers 74 causes these controlled rectifiers to shunt the resistor 60 for 100% of a timing cycle, while the fully retarded condition prevents their being fired during a timing cycle. However, practical limitations of diverter circuits, such as the time required to charge the commutating energy storage means 84 prior to firing the controlled rectifiers 74, have limited the most advanced, failure-free firing condition for these controlled rectifiers. Therefore, the resistor which is shunted by the diverter circuit 30 can be larger than the other armature resistors 54, 56 and 58. The effective resistances of this larger resistor is then decreased by an amount equal to the resistance of one of the other armature resistors when the controlled rectifiers 74 conduct for less than 100% of a timing cycle, for example, for 90% of a timing cycle.

In further accordance with this invention, the energization of the field windings 36 and 38 can be controlled by connecting the diverter circuit 30 across a resistor 208 in the shunting circuit 72. An inductor 210 shown in a preferred form of this circuit prevents abrupt changes from occurring in field current flow as the controlled rectifiers 74 are turned off and on during each of the timing cycles, thereby limiting the ripple content of the armature current and the field current to a tolerable level. The size of the inductor 210 is also determined by the inductance needed to limit the transient effects caused by abruptly disconnecting the power source from the motor power circuit and then reconnecting it once again, say when a railway vehicle passes over a rail gap. Without the inductor 210 the current rises quickly across the resistor 208, bypassing the field windings 36 and 38 when the power source is reconnected to the power circuit, so that the field excitation is temporarily, substantially reduced. The inductor 210 inhibits this transient increase in current flow through resistor 208, forcing it to excite the field windings 36 and 38.

The direct-current resistance value of the inductor 210, relative to the resistance value of the field windings 36 and 38 and resistor 212, determines the minimum field excitation of the controlled motors. The resistance value of the inductor 210 is usually in the range of from about one-fifth of the resistance of the field circuit to about twice its resistance, so that when this inductor is connected across the field windings for a maximum percentage of a timing cycle at least a minimum current flows through the field windings. As an alternative, where, for example, the controlled motors comprise a laminated structure which can better withstand transients than the usual solid iron frame motors, the inductor 210 can be replaced by a resistor having an appropriate resistance value.

The resistor 208 has a resistance substantially greater than that of the shunted field circuit, including the resistance of the field windings 36 and 38 and a resistor 212. In one motor control system constructed in accordance with this invention, the resistance of the resistor 208 was approximately 30 times greater than the resistance of the shunted field circuit. The ratio between these resistances should be large enough to provide the diverter circuit 30 with a range of adjustment between the maximum and minimum excitation of the field windings 36 and 38. Thus, when the diverter is in its fully retarded firing condition, providing maximum field excitation, the resistance of resistor 208 should cause a substantial portion of the armature current to flow through the field windings 36 and 38. The resistor 212 can be added in series with the field windings to adjust the ratio between the resistance of the field circuit and the reactor 210 without changing the resistance of 210. As will be explained below, the resistance of the resistor 208 in the present embodiment of this invention determines the voltage rating of the controlled rectifiers 74 and the charging voltage of the energy storage means 84.

As a further advantage of this power circuit, means are provided for preventing commutating current from energy storage means 84 from flowing through the resistor 208 as the controlled rectifiers 74 are being commutated. Because it prevents energy from being needlessly dissipated in the resistor 208, a diode 214 connected in series with resistor 208 decreases the amount of stored energy required for commutation. A diode 216 performs the same function while the diverter circuit 30 is shunting the resistor 60. Conventional R-C circuits 218 and 220 protect the diodes 214 and 216, respectively, from the effects of transient voltages.

Diverter circuit

The diverter circuit 30 basically comprises controlled rectifying devices 74, such as, for example, silicon controlled rectifiers, ignitrons, etc., each of which provides a similar type of control well known in the art and not requiring discussion here in detail. These controlled rectifying devices are of the type which present a relatively high blocking impedance until a point of breakdown in a timing cycle, determined by the mutual occurrence of a forward voltage bias on the devices and a firing signal, at which point current is conducted through a relatively low impedance.

By controlling the firing point of the controlled rectifiers 74 during each timing cycle of the motor control system, the average current flowing through a diverter-shunted armature resistor or through the field windings 36 and 38 can be regulated between a maximum provided by a fully retarded firing point and a minimum provided by a fully advanced firing point. When the firing point is fully retarded in the timing cycle during field shunting, the field excitation is at a maximum, while a fully advanced firing point provides a minimum field excitation. When the firing point is fully retarded in the timing cycle during armature resistor shunting, the effective resistance of a shunted resistor is at a maximum, while a fully advanced firing point provides a minimum effective resistance of this shunted resistor. Advancing the firing points during resistor shunting in propulsion and braking and during field shunting in high speed propulsion, has the same effect as retarding the firing points during field shunting at the start of propulsion and braking: it increases the generated tractive effort.

Controlled rectifiers, such as the silicon controlled rectifiers 74, continue to conduct as long as they remain forward biased and the current flowing through them exceeds their holding current level. The energy stored in energy storage means 84 must eventually be discharged through these controlled rectifiers in response to commutating signals to reduce the current flow through them below the holding current level and then reverse bias them for a time period sufficient to turn them off.

The energy storage means 84 include LC circuit legs comprising a pair of capacitors 222 and 224 and a pair of inductive reactors 226 and 228. The capacitors 222 and 224 are charged through a diode 230 by the voltage developed across the contact arms 68 and 70, and the non-conducting controlled rectifiers 74. Should the voltage level at these contact arms be insufficient to fully charge the capacitors 222 and 224 during a particular load range, an auxiliary voltage source at terminals 232 and 234, which is turned on at a preselected time interval after the occurrence of the commutating pulses, completes the charging through a diode 236. It is well known in the art that the pair of LC legs shown in energy storage means 84 provides flatter charging and discharging current wave shapes than would a single LC leg of this type, while the addition of other legs in a redesigned commutating circuit would further limit the peak charging and discharging currents.

The controlled rectifiers 74 are commutated after commutating pulses applied to the terminals 80 and 82 cause the charge on the energy storage means 84 to be reversed through a controlled rectifier 238 which is connected between the reactor 228 and the terminal 82. A diode 240 responds to the reversed voltage across the capacitors 222 and 224 to aid in recharging them in the forward direction once again while commutating the controlled rectifier 238 by reverse biasing its cathode and anode electrodes.

The diverter circuit 30 also includes an inductor 241 connected between the anode of the diode 230 and the anode of the controlled rectifiers 74. A primary function of the inductive reactor 241 is to provide a calculated delay in the commutation of the controlled rectifiers 74 as the charge on the capacitors 222 and 224 is being reversed through the controlled rectifier 238. This delay allows a higher reverse charge to build up across the capacitors 222 and 224 before the controlled rectifiers 74 are turned off. The higher reverse charge subsequently holds the diode 240 on longer, aiding in the commutation of the controlled rectifier 238.

A conventional RC circuit 242 protects the controlled rectifiers 74 from transient voltages, while an RC circuit 244 and a capacitor 246 are connected across the controlled rectifier 238 and the diode 240 for the same purpose.

Figure 10:
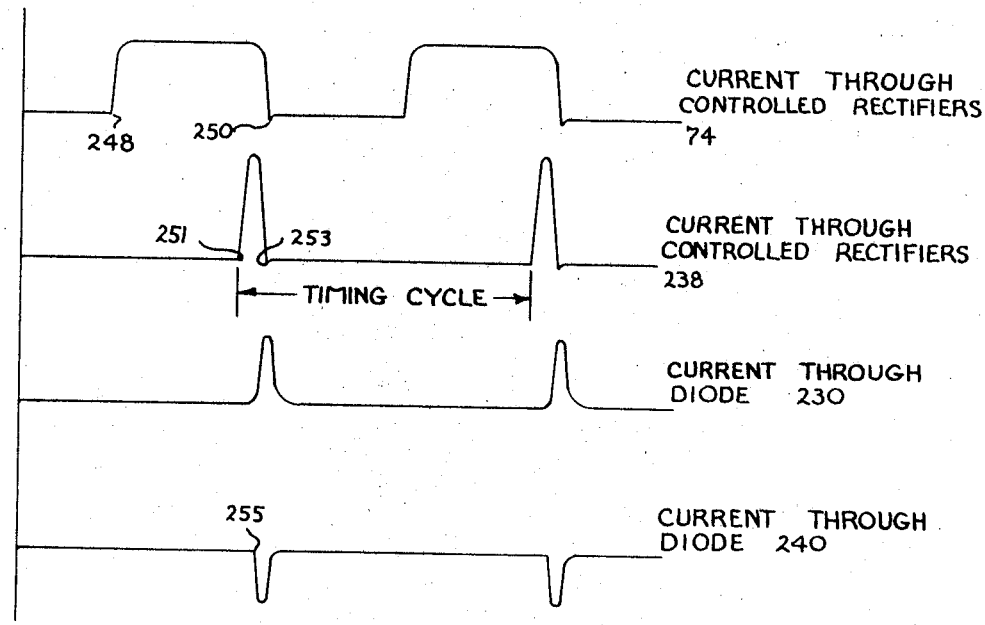
FIG. 10 shows the current wave forms at various points in the diverter circuit.

The operation of the diverter circuit 30 can be better understood by referring to the current wave diagram in FIG. 10 which represents the magnitude and duration of current flow through the various controlled rectifiers and diodes in the diverter circuit 30.

At some point during the timing cycle of the diverter circuit 30, say at a point 248 of FIG. 10, firing signals are applied to the terminals 76 and 78 to turn on the controlled rectifiers 74. Thereafter they conduct current heavily until they are commutated, say at point 250 of FIG. 10. Before the controlled rectifiers 74 were turned on, however, the capacitors 222 and 224 were charged to a voltage level proportional to the larger of a preselected voltage level and a voltage level proportional to the voltage developed across the contactors 68 and 70 and the nonconducting controlled rectifiers, as explained in the general description above. The charge across the capacitors 222 and 224 reverse biases the diodes 230 and 236 and forward biases the controlled rectifier 238. The diode 230 isolates the energy storage means 84 from the controlled rectifiers 74 after the capacitors 222 and 224 have been charged allowing these capacitors to retain their charge while the controlled rectifiers 74 are conducting.

In prior diverter or chopper-type circuits for performing the function of the diverter circuit 30, capacitors in commutating circuits were charged while the main controlled rectifiers were nonconducting. However, means were provided for reversing the charge on these capacitors, in preparation for commutating the main controlled rectifiers, by discharging these capacitors through the main controlled rectifiers. The commutating energy was thus conducted in the forward direction through the main controlled rectifiers, with the resulting increased current flow contributing to the detrimental heating of these controlled rectifiers. Auxiliary controlled rectifiers were then turned on to commutate the main controlled rectifiers.

To begin the commutation of the controlled rectifiers 74 of the diverter circuit 30, commutating pulses applied to the terminals 80 and 82 turn on the controlled rectifier 238, say at a point 251 of FIG. 10, to reverse the polarity of the voltage across the capacitors 222 and 224. However, the charge on these capacitors reverses as current flows through the controlled rectifier 238 instead of the main controlled rectifiers 74. As the charge across the capacitors 222 and 224 is reversed, the current flowing through the controlled rectifiers 74 and the reactor 241 is reduced below the holding current level. These controlled rectifiers are reverse biased for a time sufficient to keep them turned off.

After the voltage across the capacitors 222 and 224 has been reversed, the current flow through the controlled rectifier 238 decreases below its holding current level and its turn-off is initiated, as at point 253 of FIG. 10. The charge across these capacitors now forward biases the diode 240 (at point 255 of FIG. 10) and reverses the current flow in the reactors 226 and 228. The energy left on the capacitors 222 and 224 aids in recharging these capacitors in the direction they were originally charged, besides commutating the controlled rectifier 238 by keeping the diode 240 conducting for a time interval. Thus, the charge remaining on the capacitors 222 and 224 after the controlled rectifiers have been commutated aids the current flowing through the diodes 230 and/or 236 in recharging these capacitors, thereby conserving energy and decreasing the need for the auxiliary energy source to aid in recharging these capacitors. It is pointed out once again that the diodes 214 and 216 prevent the energy used for commutating the controlled rectifiers 74 from being dissipated through the resistors 208 and 60 during field shunting and resistor shunting, respectively, further conserving energy needed for commutating the controlled rectifiers 74.

Referring once again to FIG. 10, note that at no time during the timing cycle does energy used for commutating the controlled rectifiers 74 flow in a forward direction through these controlled rectifiers to impose added duty on them beyond that imposed by current which is diverted from the power circuit. In other words, the original charge across the capacitors 222 and 224 is reversed through the controlled rectifier 238 without flowing through the controlled rectifiers 74 as well. In contrast with prior art diverter-type circuits, the auxiliary controlled rectifiers reverse the charge on the commutating capacitors, as well as initiated commutation of the main controlled rectifiers.

The resistance value of the resistors 60 and 208 plays an important part in determining the voltage rating of the controlled rectifiers 74 and in determining the voltage developed across the capacitors 222 and 224 and the energy storage means 84. After the controlled rectifiers of the diverter circuit 30 are turned off during field shunting, for example, the substantially constant current flow through the inductor 210 builds up a voltage across hte resistor 208 which is much larger than the voltage developed across the field windings 36 and 38, because the resistance of the resistor 208 is substantially larger than the resistance value of the field windings. Therefore, controlled rectifiers 74 can be of the medium voltage type, for example, designed to block a 300 volt forward voltage, which can conveniently conduct the high current which flows through the power circuit. Furthermore, because a higher voltage is developed across the resistor 208 after the controlled rectifiers 74 are commutated, this voltage can normally be used to charge the energy storage means 84 for commutation and minimize the power drain from the auxiliary energy source at the terminals 232 and 234. The transient voltage imposed on the fields 36, 38, inductor 210 and controlled rectifiers 74 by the closing of contact A1A requires use of components with appropriately high voltage ratings. Thus, no additional voltage requirements are imposed on these components by allowing a suitably high voltage for facilitating energy storage in capacitors 222 and 224 to be developed across resistor 208. Additionally, the shunting effect of these capacitors provides important transient voltage protection to associated controlled rectifier and diode devices and utilizes such transients to increase the storage of commutation energy. The available commutating time can be proportioned between the controlled rectifiers 74 and 238 by adjusting the inductance of the inductor 241.

The energy storage means 84 of the diverter circuit 30 can be discharged during each timing cycle whether or not the controlled rectifiers 74 are conducting since the charge reversing current does not flow through these main controlled rectifiers. Commutating pulses normally discharge energy storage means 84 when the controlled rectifiers 74 are not conducting to provide a means for determining whether the commutating circuit is operating properly. Means may be provided for detecting signals produced by the periodic discharge of this energy storage means, with the absence of these signals indicating that the commutating circuit has malfunctioned and that the controlled rectifiers 74 should not be fired.

Propulsion or braking initiation circuit

Referring to FIG. 3, the contact arms 91 and 94 and contact arms 260 and 262 set up the power and control circuits for propulsion when the handle 92 of the manually controlled switches 90 move to the left, that is, in the direction of the arrow marked "propulsion." The movement of the contact arm 91 first interrupts the flow of current from the power source 96 and through the contacts 93, A3C, A9C or A10C, and relay coil A10 to cause the contact arm 44 in FIG. 1 to break contact with the contact A10A.

When the contact arm 91 makes contact with the contact 95, the unregulated voltage of the power source at terminal 96 causes the circuit 104 to generate the signal which arms the control circuits 108, 110, 112 of FIG. 5 and 122 of FIG. 7 (charges their timing circuits) which set up the initial conditions for the operation of the diverter circuit 30 in FIG. 1 at the start of propulsion and also begins to energize the relay coil A2 of FIG. 3. Current flowing through the terminal 95 and contact A1B and through a diode 266 and resistor 268 produces the arming signal (capacitor charging) at the conductor 106. This signal is terminated, to allow the control circuits energized by it to start functioning, after the relay coil A1 is energized to close the propulsion circuit in FIG. 1. As the contact arm 86 moves close to the contact A1A, that is toward connecting the power source at terminals 40 and 42 to the power circuit, the contact arm 136 breaks contact with the contact A1B to terminate the signal at conductor 106 and cause the control circuits to actually begin functioning, setting up the initial operating conditions which prevent diverter malfunctioning.

It is contemplated that other means could be used to sense that the contact arm 86 will imminently close the power circuit and in response to this "knowledge" actuate control circuits. For example, a photosensitive type circuit could be used for this purpose. The reason for sensing the imminent closure of the power circuit is that the functions performed by the responding control circuits are necessary to prevent a malfunction at the start of propulsion. However, if the control circuits were actuated when the relay coil A1 was first energized, the timing capacitors in their timing circuits would have been discharged appreciably before the slow-responding, heavy duty contact arm 86, which can respond within a variable time period after the relay coil A1 was energized, actually closed the power circuit. The control circuits then may fail to perform their necessary functions at the desired time: as close as possible to the precise time of power application.

The relay coil A2 of the relay 103 is energized through the terminal 95 and contact A10B to connect the armature windings 32 and 34 (FIG. 1) in a propulsion circuit through contact arm 64 and contact A2A and through contact arm 66 and contact A2B. Interlock A10B assures that A10A is open during this switching. Upon the energization of the relay coil A2 (with the relay coil A3 now de-energized) and upon movement of its contact arms, the contact arm 264 engages contact A2C. The relay coil A1 is energized through contact A9D and contact arm 274 when energization of relay coil A9 of FIG. 4 produces field shunting at the start of the propulsion cycle and has moved the contact arms 274 from the position shown in FIG. 3. A contact arm 276 locks the relay coil A1 into propulsion by making contact with terminal A1D when the relay coil A1 is energized. Thus, when 274 leaves A9D as resistor shunting is entered into, relay coil A1 is not de-energized and armature current continues to flow in the power circuit.

The propulsion limiting circuit 162 in FIG. 3 is also energized through the contact arm 91 and the contact arm 95 at the start of the propulsion cycle, establishing control of the maximum propulsion signal at a conductor 278 for use in the regulator of FIG. 8. In the propulsion limiting circuit, a voltage regulator comprises a resistor 280, a breakdown voltage device 282 and a potentiometer 284 having a slide wire 286. The resistor 280 is connected through the breakdown voltage device 282 to a common conductor 289, while the potentiometer 284 is connected across the breakdown voltage device 282. The position of the slide wire 286 can be adjusted by the operator of the vehicle to adjust the voltage level of the maximum propulsion signal at the conductor 278 and thus limit the maximum generated tractive effort to a preselected level. A diode 288 couples the maximum propulsion signal to the conductor 278, while a diode 290 connects the braking limit circuit 166 to the conductor 278 as well, to assure that during braking when circuit 166 is controlling there is a large signal at the conductor 278. This signal at 278 during braking causes zero output from circuit 160 and assures that the maximum propulsion signal does not interfere with the desired maximum braking signal.

The remaining portion of the circuit shown in FIG. 3 performs similar functions at the start of a braking cycle that is, movement of the contact arm 91 in the direction of the arrow marked "braking" de-energizes the relay coil A1 to open the propulsion circuit; the circuit 104 is energized once again to provide a signal at conductor 106 which sets up initial diverter circuit conditions to prevent malfunctions at start of braking; relay coil A3 is energized through contact A1C after A1A is opened, to connect the motor armatures 32 and 34 (FIG. 1) for braking; the braking limit circuit 166 establishes the maximum braking signal; and thereafter the relay coil A10 is energized to complete the braking cycle upon the movement of appropriate interlocking contact arms.

After the relay coil A1 is de-energized by the movement of the contact arm 91 to the contact 93, the relay coil A3 is energized by current flowing through the terminals 93 and A1C, and through a contact arm 292 to connect the motor armatures for dynamic braking. The contact arm 292 has remained open until the relay coil A1 is de-energized and A1 switch has opened, preventing the armatures from being connected for braking until the propulsion circuit is opened and thereby preventing motor plugging and arcing across the contact A2A and the contact arm 64 (FIG. 1) and across the contact A2B and the contact arm 66.

The relay A10 is energized to close the dynamic braking circuit through a contact A3C, a contact arm 304, a contact A9C, and a contact arm 306. The contact arm 304 makes contact with the contact A3C after the relay coil A3 is energized, and the contact arm 306 makes contact with contact A9C after the relay coil A9, in FIG. 4; is energized to assure that the relay coil A10 does not close the braking circuit until the armatures of the controlled motors have been connected for braking and the diverter circuit 30 connected for field shunting.

The braking limiting circuit 166 includes a resistor 294, breakdown voltage device 296, and a potentiometer 298 having a slide wire 300. The slide wire 300 of the potentiometer 298 can be adjusted by an operator to allow the maximum braking signal level at a conductor 302 to equal either the breakdown voltage level of the device 296 or any fraction thereof.

The control circuits 108, 110, 112 of FIG. 5 and the control circuit 122 of FIG. 7 which prevent a malfunction at the beginning of a braking cycle are armed when current is coupled through the contact A9C, the contact arm 306, a contact arm 308, a contact A10C, a diode 310, and a resistor 312 to the conductor 106 to energize this conductor. The contact arm 308 responds to the movement of the contact arm 44 of FIG. 1 toward contact A10A in the same manner as the contact arm 136 responds to the movement of the contact arm 86 at the start of propulsion. As the contact arm 44 moves toward the contact A10A so that the closing of the braking circuit is imminent, the contact arm 308 breaks contact with the contact A10C, terminating the signal at the conductor 106 to actuate the armed control circuits.

Field and resistor shunting control

Referring now to FIG. 4, the circuit 100 basically comprises the over-center, toggle-type relay 102 in which the relay coil A9 must be energized (with the relay coil A8 de-energized) to switch the diverter circuit 30 in FIG. 1 from resistor shunting to field shunting and the relay coil A8 must be energized (with the relay coil A9 de-energized) to switch the diverter circuit 30 from field shunting to resistor shunting.

Means are provided in FIG. 4 for controlling whether the diverter circuit 30 performs armature resistor shunting or field shunting, these means including a controlled rectifier 314, a relay 316, and a pulse signal generator 318. The controlled rectifier 314 is connected in series between a conductor 320, which provides power to energize the relay 102, and the relay coil A8. The controlled rectifier 314 is turned on by pulses coupled through a conductor 324, to energize the relay coil A8. The relay 316 controls the energization of relay coil A9. A relay coil A11 of a relay 316 is energized during resistor shunting when a contact arm 330 makes contact with a contact A8C to connect the energized conductor 320 to a conductor 332. Energization of the relay coil A11 causes a contact arm 334 to make contact with a terminal A11A, connecting the energized conductor 320 to the relay coil A9 to initiate field shunting. Since the relay 102 is of the over-center, toggle-type, it retains the last position to which it is set. The relay coil A9 causes field shunting only when the relay coil A8 is not energized at the same time.

The controlled rectifier 314 can be commutated in any one of three ways: First, by a signal from the signal generator 172, outlined in dotted lines in the upper left of FIG. 4, which signal is generated in response to a minimum shunt signal if A8E is closed to arm 400; or, second, by signals from signal generator 318 in response to maximum shunt signals after all of the armature resistors 39 (FIG. 1) are shunted by their respective contact arms; or, third, by interruption of voltage on conductor 320 and 97 by movement of contact 94.

The signal generator 172 can provide firing pulses to turn on the controlled rectifier 314 when the diverter 30 of FIG. 1 to switch from field shunting to resistor shunting and can also provide commutating pulses to turn off this controlled rectifier 314 soon after resistor shunting has begun. A controlled rectifier 336 in the signal generator 172 responds to minimum shunt signals from FIG. 6 to charge capacitor 350 as described later and to energize a relaxation oscillator 338 which, after a predetermined time delay, fires a controlled rectifier 340 to provide an output signal at a conductor 342. Minimum shunt signals are coupled through a diode 344 and a current limiting resistor 346 to turn on the controlled rectifier 336. An under-damped LC circuit comprises an inductor 348, connected between conductor 320 and the controlled rectifier 336, and a capacitor 350.

When the controlled rectifier 336 is turned on, the capacitor 350 is charged to energize the relaxation oscillator 338. Since the LC circuit is under-damped, the capacitor 350 attempts to discharge back through the inductor 348, commutating the controlled rectifier 336.

The relaxation oscillator 338 comprises a unijunction transistor 352 having resistors 354 and 356 in its base circuits and having an RC timing circuit comprising a resistor 358 and a capacitor 360. The emitter-electrode of the unijunction transistor 352 is connected between the resistor 358 and the capacitor 360 of the timing circuit so that when voltage across the capacitor 360 reaches a preselected percentage of the base-to-base voltage of the unijunction transistor, the capacitor 360 is discharged through the resistor 356. The voltage developed across the resistor 356 fires the controlled rectifier 340 and causes an output signal to be coupled through a diode 362 to the conductor 342.

A voltage regulator comprising a resistor 364 and a breakdown voltage device 366 maintains a constant voltage for the relaxation oscillator 338 whenever it is energized so that the firing time constant of this relaxation oscillator is substantially constant whenever the signal generator 172 is operated and the unijunction device is protected from excessive voltage.

The signal generator 318 at the lower right of FIG. 4 is very similar in construction and mode of operation to the signal generator 172. Power is supplied to enable the signal generator to be energized when a contact arm 368 makes contact with the contact A7E, after all the armature resistors 39 in FIG. 1 have been shorted out of the power circuit and voltage has been thus removed from A8A and A8B. A commutating pulse from the signal generator 318 then turns off the controlled rectifier 314, de-energizing the relay coil A8 and allowing the energized relay coil A9 to cause the diverted circuit 30 in FIG. 1 to shunt field windings 36 and 38.

The signal generator 318 is turned on when maximum shunt signals are coupled from FIG. 6 through the conductor 176, and through a controlled rectifier 369, a conductor 370, a resistor 372 and a pulse transformer 374 to the gate circuit of a controlled rectifier 376 and if this controlled rectifier 376 is forward biased through the contact arm 368 and the contact A7E. The controlled rectifier 376 then causes a relaxation oscillator 378 to turn on a controlled rectifier 380, which provides a commutating at a terminal 382 to the cathode circuit of the controlled rectifier 314.

To energize the relaxation oscillator 378, the capacitor 384 of an under-damped LC circuit is charged through an inductor 386 of this circuit and the controlled rectifier 376. A voltage regulator including a resistor 388 and a breakdown voltage device 390 maintains a substantially constant voltage across the relaxation oscillator 378. An RC timing circuit 392 raises an emitter voltage of a unijunction transistor 394 to its breakdown voltage level, causing the capacitor of the timing circuit 392 to be discharged through a resistor 396 to fire controlled rectifier 380. At this time this controlled rectifier then couples a commutating pulse through a diode 398 to the terminal 382 to commutate the controlled rectifier 314.

To summarize the operation of the field and resistor shunting control circuit of FIG. 4, at the start of a propulsion cycle, for example, the relay coil A11 is energized through the contact A8C, the contact arm 330, the conductor 320, and the conductor 97. The relay coil A9 is thus energized through the now closed circuit of the contact arm 334 and the terminal A11A, the conductor 320, and the conductor 97. The diverter circuit 30 (FIG. 1) is now connected for field shunting.

When the field windings are energized a predetermined maximum amount, this is, when the firing of the controlled rectifiers 74 is fully retarded so that the diverter circuit 30 shunts them for some preselected minimum proportion of the timing cycle, minimum shunt signals at the conductor 174 cause the signal generator 172 to couple output signals through the conductor 342, contact arm 400, contact A9F, conductor 324, diode 326, and resistor 328 to turn on the controlled rectifier 314.

After the relay coil A9 had been energized, the contact arm 330 broke contact with terminal A8C to de-energize the relay coil A11 and consequently de-energizing the relay coil A9. Thus, when controlled rectifier 314 is now turned on, the energization of relay coil A8 connects the diverter circuit 30 in FIG. 1 across the resistor 60 to provide resistor shunting. At the same time, the contact arm 330 makes contact with the contact A8C to energize the relay coils A11 and A9 once again.

With the energization of relay coil A8, A9 being de-energized, the contact arm 400 breaks contact with the contact A9F and makes contact with the contact A8E. Should a minimum shunt pulse be generated before relay coil A4 is energized to move contact arm 402 from A4E, calling for a decrease in generated tractive effort without entering braking, an output signal from the signal generator 172 is coupled through the conductor 342, the contact arm 400, contact A8E, contact arm 402, and contact A4E, to the cathode circuit of the controlled rectifier 314. This signal commutates the controlled rectifier 314, de-energizing the relay coil A8, whereupon the previously energized relay coil A9 reconnects the diverter circuit 30 in FIG. 1 across the field windings 36 and 38.

The relay coil A7 in FIG. 4 is energized at the end of the resistor shunting portion of the tractive effort control system to cause a contact arm 52 (FIG. 1) to shunt out the armature resistor 60. In FIG. 4 itself, contact arm 368 makes contact with contact A7E to forward bias the controlled rectifier 376. A maximum shunt signal is coupled through the conductor 176, the controlled rectifier 369, the conductor 370, resistor 372, and pulse transformer 374 to turn on the controlled rectifier 376. The signal generator 318 then provides the commutating pulse at the terminal 382 to turn off the controlled rectifier 314 and de-energize the relay coil A8. The relay coil A9, which had been energized again after resistor shunting had been set up, now causes the diverter circuit 30 of FIG. 1 to be connected for the high speed field weakening portion of the propulsion cycle.

Sequential resistor shunting control

FIG. 4 also includes means comprising the relay coils A4–A7 for causing the armature resistors 39 in FIG. 1 to be shunted one by one in a predetermined sequence as the series armature resistance is decreased by the diverter circuit. Briefly, during the resistor shunting portion of the propulsion cycle, the controlled rectifiers 98, shown specifically as controlled rectifiers 406, 417, 422 and 424, energize these relay coils in the sequence A4, A5, A6 and A7 in response to successive maximum shunt signals. These relay coils can be sequentially de-energized in the reverse of this sequence through the contact arms 184, in response to minimum shunt signals which energize the generator 172.

Contact arm interlocks between each of the sequentially energized relay coils A4–A7 and the controlled rectifier circuit of the next to be energized relay coil of the sequence prevents the energization of one of these relay coils out of sequence. At the beginning of the resistor shunting portion of the propulsion cycle, for example, the contact arm 330 engages the contact A8C to forward bias the controlled rectifier 406 through the conductor 332 and a diode 408. A first of the maximum shunt signals, generated when the shunting action of the diverter circuit 30 of FIG. 1 lowers the effective resistance of resistor 60 by an amount equal to the resistance of the resistor 54, turns on the control rectifier 369. A firing pulse for the controlled rectifier 406 is coupled through a conductor 370, a diode 410, and a resistor 412 to the gate electrode of the controlled rectifier 406. The controlled rectifier 406 is turned on to energize the relay coil A4. The contact arm 46 in FIG. 1 makes contact with the terminal A4A, thereby shunting out the resistor 54.

After the relay coil A4 is energized, successive maximum shunt signals cause relay coils A5, A6 and A7 to be energized in the same manner as was the relay coil A4. Energization of the relay coils A4, A5 and A6 causes contact arms 414, 418 and 420 to engage contacts A4D, A5D, and A6D. The diode between the anode of controlled rectifier 416 and the anode of controlled rectifier 406 keeps the controlled rectifier 406 energized when the contact arm 330 is moved away from contact A8C.

Means, including the contact arrangement generally shown as 184, comprising the individual contact arms 400, 402, 426, 428 and 430, are provided for de-energizing the relay coils in the sequence A7, A6, A5, A4 and A8, the reverse of the energization sequence. The contact arm 400 engages the contact A9F after relay coil A9 is energized (with relay coil A8 de-energized) to connect the diverter circuit 30 (FIG. 1) for field shunting and engages the contact A8E when the relay coil A8 is energized (with relay coil A9 de-energized) to connect the diverter circuit 30 for resistor shunting. The remaining contact arms retain the position shown in FIG. 4 until the individual relay coil after which their contacts are numbered is energized.

As discussed above with respect to the resistor and field shunting control, when resistor shunting has begun and prior to the time that the relay coil A4 is energized to shunt out the first resistor 54 (FIG. 1), the contact arm 400 makes contact with the terminal A8E. Should there be a reduced call for tractive effort, a minimum shunt signal energizes the generator 172 so that a signal is coupled through conductor 342, the contact arm 400, the contact A8E, the contact arm 402, the contact A4E, and the conductor 404, to the cathode circuit of the controlled rectifier 314. This controlled rectifier is commutated, de-energizing the relay coil A8, thereby causing the energized relay coil A9 to connect the diverter circuit 30 in FIG. 1 back to field shunting.

If the resistor shunting portion of the propulsion cycle has progressed to the point where the relay coil A4 is energized, the contact arm 402 then makes contact with the contact A4F. In response to a minimum shunt signal provided at this time, a signal from the generator 172 is coupled through conductor 342, the contact arms 400, 402 and 426, and through a contact A5E and a conductor 432 to commutate the controlled rectifier 406. As a result the relay coil A4 is de-energized, causing the resistor 54 in FIG. 1 to be unshunted. If the propulsive effort now generated is still too high, the controlled rectifier 314 is commutated to switch the diverter circuit 30 back to field shunting as described above. Obviously, the propulsive effort may be increased by proceeding through the normal acceleration sequence from any point of control.

In a similar manner, the controlled rectifiers 416, 422 and 424, controlling the energization of the relay coils A5, A6 and A7, can be commutated through conductors 434, 436, and 438, respectively, if a lower tractive effort is called for while these relay coils are energized. Furthermore, a minimum shunt pulse during high speed field shunting can energize relay coil A8 to switch the diverter circuit 30 of FIG. 1 to resistor shunting, with a second minimum shunt signal de-energizing relay coil A7 to unshunt the resistor 60.

Regulator circuit

In the regulator circuit shown in FIG. 8, a transistor 440 in means 152 compares the voltage at the load signal line 154 with the reference voltage determined by breakdown voltage level of the breakdown voltage device 156. When the voltage level of the load signal line 154, comprising the sum of the voltage produced by motor characteristic measuring means 157 and the open loop voltage developed across the summing diode 158, reaches a predetermined nominal value, the transistor 440 is turned on, drawing current through the conductor 148 to limit the tractive effort generated by the motor control system of this invention. It will be recognized by those skilled in the motor control art that regulator circuits other than that specifically shown in FIG. 8 can provide the response to motor characteristics and control events, such as armature resistor shunting, which is necessary for this invention.

In the circuit 152, the conductor 148 is connected through a resistor 442 to the collector of the transistor 440. The emitter electrode of this transistor is connected through a rheostat 444, which limits the current flow through the conductor 148, to the breakdown voltage device 156. The load line 154 biases the base electrode of the transistor 440 through a voltage divider comprising resistor 446, a potentiometer 448 having a slide wire 450, and a resistor 452 and through a resistor 454. The slide wire 450 can be adjusted to comply with the nominal signal level of the load line 154.

Referring to FIG. 1 along with FIG. 8 to describe the motor operating level measuring means 157, means 88 include measuring reactors 202 and 204 for sensing the armature current and armature voltage levels, respectively, of the controlled motors. FIG. 8 shows that the secondary winding $202C_2$ couples signals, representing armature current, to current measuring means 456 and that the secondary winding $204C_2$ couples signals, representing the armature voltage level, to voltage measuring means 458. A gating circuit represented by the diodes 460 and 462 connects the larger of the resulting direct-current signals from the voltage and current measuring means to the load line 154.

In the illustrated embodiment of this invention, the tractive effort generated is regulated in response to the armature current only, during propulsion. Therefore, the voltage signals produced by the current measuring means 456, representing the armature current level, are arranged to be larger than those produced by the voltage measuring means 458. During braking, however, when the controlled motors are operated as direct-current generators, the generated tractive effort is regulated in response to armature voltage level when the field windings are being gradually unshunted at high speeds. The conductors 464 and 466 are shorted by the contactor 262 in FIG. 3 to arrange for difference current levels during propulsion and braking. Once the field windings are fully energized, the decreasing motor speed lowers the generated armature voltage below a maximum set allowable level and the braking effort is regulated in response to armature current.

The open loop voltage level developed across the summing diode 158 comprises the largest of 4 signals: a pulse-type wheel slip signal developed by a wheel slip circuit 468, a pulse-type contact arm movement signal developed by the circuit 182, a propulsion limiting signal developed by the propulsion control circuit 160, and a braking limiting signal developed by the braking control circuit 164.

When a wheel slip occurs the generated tractive effort must be reduced sharply to allow recovery from the slip and then increased gradually to prevent further slip. To this end, a wheel-slip relay 470, energized upon receipt of a signal from a wheel-slip detector (not shown), connects a regulated source voltage through contacts 472 and a diode 474 to the load signal line 154. Energization of the relay 470, therefore, is operative to raise the voltage level of the load signal line 154 to that of the regulated power source, causing an immediate reduction in motor current and torque.

Simultaneously, energization of the wheel slip relay 470 charges a capacitor 476 in a wheel slip timing circuit. The capacitor 476 is charged through a resistor 478 and develops a voltage across a voltage divider comprising resistors 480 and 482. A diode 484 couples the voltage at the junction of these resistors to the cathode of the summing diode 158. After wheel slipping has terminated, the capacitor 476 discharges through the resistors 480 and 482 at a predetermined rate to gradually decrease the voltage level at the anode of the diode 848. The motor current and resulting generated tractive effort increases at the same rate, maintaining the total voltage at the load signal line 154 at the nominal regulating level as the decaying voltage of the capacitor 476 trys to decrease it.

In operations involving raising of the armature current to the regulated level, the circuit 182 increases the voltage level across the summing diode 158 each time an armature resistor shunting contact arm (FIG. 1) or a diverter-connection controlling contact arm moves (as caused by a maximum shunt signal from FIG. 6) so that the sum of this voltage and the motor characteristic signals from the circuits 157 is made to equal the predetermined nominal regulating level of the load signal line 154. The occurrence of firing signals in the timing cycles is retarded to prevent an abrupt increase in tractive effort at this time. After a contact arm movement is sensed, the voltage-level across the diode 158 begins to decay at a predetermined rate, allowing the armature current level (and thus the generated tractive effort) to increase at an equal rate. To assure that the generation of firing signals is immediately fully retarded with contact arm movement, a voltage divider 183 turns on transistors 483 and 485 (FIG. 5) to discharge a filter in the circuit 146 and turn off the firing signal generator 132, respectively.

Upon receipt and termination of the contact movement signal from conductor 180, a pulse circuit 486, which may be of the type that responds to "defire pulses" in my issued U.S. Pat. 3,257,597, intended to be incorporated herein by reference, biases the voltage divider 183 and turns on a transistor 488. The voltage divider 183 immediately turns on transistors 483 and 485 (FIG. 5) to discharge a filter in circuit 146 and immediately retard the generation of firing signals by generator 132 of FIG. 6. The transistor 488 remains on long enough to charge a capacitor 490 in a timing circuit 492 to a voltage level which causes regulation. A transistor 494 and a breakdown voltage device 496 limit the charge across the capacitor 490 to this level. The load signal line 154 is connected through a voltage divider comprising a resistor 498 and a rheostat 500 to a common bus 501. The breakdown voltage device 496 is connected between a junction of these two resistive components and the base electrode of the transistor 494. After the sum of the voltage components at the load signal line 154 reaches the predetermined nominal level or slightly above, the voltage across the rheostat 500 exceeds the breakdown voltage level of the device 496 so that the transistor 494 turns on to limit the charging of the capacitor 490.

After the contact movement signal from pulse circuit 486 has terminated and the transistor 488 is turned off, the capacitor 490 begins to discharge, allowing the voltage coupled through a diode 502 to the summing diode 158 to decrease at a predetermined rate. The characteristic measured by the circuit 157, such as the armature current, increases at the same rate.

After the armature current reaches the regulated level, the contact arm movement, say of an armature resistor-shunting contact, occurs when at increasing motor speeds only a gradual decrease in armature resistance is necessary to maintain the current at the regulated level. At this time, since the load signal line is already at the nominal regulating level, little or no extra open loop voltage is developed across the summing diode 158. However, the voltage divider 183 is biased to force the transistors 483 and 485 (FIG. 5) to discharge the filter in circuit 146 and immediately retard the generation of firing signals by signal generator 132 of FIG. 6.

The propulsion and braking limiting signals of the control circuits 160 and 164 determine the maximum tractive effort which can be generated by the motor control system of this invention. For example, where during propulsion the sum of the propulsion limiting voltage coupled through a diode 504 to the summing diode 158, plus the voltage proportional to the armature current equals the predetermined nominal level of the load signal line 154, the propulsive tractive effort cannot be increased any further. The propulsion limiting voltage varies directly with changes in the maximum propulsion signals received from FIG. 3 by the propulsion circuit 160 through the conductor 278. The maximum propulsion signals are coupled to the base electrode of a transistor 506 and through its collector electrode to the base electrode of a transistor 508.

An increase in the voltage level at the conductor 278 increases the generated propulsive tractive effort. The increased voltage level turns on the transistor 506 which then shunts current from the emitter ciucit of the transistor 508. The transistor 508 conducts a lesser current, thereby decreasing the voltage level at the anode of the diode 504. This produces a lower minimum voltage level across the summing diode 158, during propulsion, allowing a higher armature current level to be developed.

Similarly, a decreased signal level at the conductor 278 decreases the generated propulsive tractive effort. The decreased signal level turns off the transistor 506, increasing the current flow through the emitter circuit of the transistor 508 which increases the voltage level at the anode of the diode 504. The nominal singal level at the load signal line 154 (and thus regulation) is reached at a lower armature current level.

An increase in the maximum braking signal level at the conductor 302 decreases the generated braking tractive effort. A transistor 512, connected in the base circuit of a transistor 514 responds to the maximum braking signal. An increase in this signal turns on the transistor 512, increasing the current flow through the emitter and base electrodes of the transistor 514 to cause it to conduct current more heavily. The voltage level at the anode of the diode 510 thus increases, decreasing the allowable armature voltage or armature current level in the controlled motors.

A decrease in the maximum braking signal level at the conductor 302, on the other hand, tends to turn off the transistors 512 and 514, decreasing the braking limiting signal level at the anode of the diode 510. Thus, the regulated armature voltage or armature current can increase to provide a higher braking tractive effort.

Since a decrease in the maximum propulsion signal provides a decrease in propulsive tractive effort and a decrease in the maximum braking signal provides an increased braking effort, the propulsion limiting circuit 160 and the braking limit circuit 164 operate in a fail-safe manner.

Contact arm movement signals

The circuit 178 in FIG. 4 generates contact arm movement signals each time the contact arms 68 and 70 in FIG. 1 are being prepared to change the connection of diverter circuit 30 between field and resistor shunting and each time one of the resistor-shunting contact arms 46, 48, 50 and 52 is told to move, thereby arming the pulse circuit 486 of FIG. 8. The circuit 178 of FIG. 4 terminates these signals when one of these contact arms moves toward making the desired connection.

The circuit 178 basically comprises controlled rectifiers 369 and 516 and contact arms 518, 520, 522, 524 and 526 connected to the anode circuits of these controlled rectifiers. The controlled rectifier 369 is turned on in response to maximum shunt signals coupled from FIG. 6 through the conductor 176 to develop an output signal across a resistor 528. The controlled rectifier 516 is turned on when minimum shunt signals are received from FIG. 6 through the conductor 174 and a diode 530 and a resistor 532 to develop output signals across a resistor 534. When the diverter circuit 30 of FIG. 1 is shunting for predetermined maximum and minimum portions of a timing cycle, a signal, arming the pulse circuit 486 for response when contact arm movement is sensed, is coupled through diodes 536 or 538, and through the conductor 180 to the regulator circuit in FIG. 8.

The controlled rectifiers 369 and 516 are forward biased through the contact configuration which includes the contact arms 518 through 526 and through a conductor 540, the contact A7D, the contact arm 368, and the conductors 320 and 97. The forward bias on the controlled rectifiers 369 and 516 is terminated when one of the contact arms 518–526 senses that the contact arms 68 and 70 of FIG. 1 are moving or one of the contact arms 46, 48, 50 and 52 of FIG. 1 is moving. That is, when one of these contact arms of FIG. 1 moves toward making contact with a contact point, say to short circuit a series armature resistor, a corresponding contact arm in the circuit 178 temporarily opens the anode circuits of the controlled rectifiers 369 and 516 to turn them off. The contact arm movement signal is thus terminated, actuating the pulse circuit 486 of FIG. 8.

The signal developed across the resistor 528 in response to the maximum shunt signals, is also coupled through the conductor 370 to the energization control circuits of the relay coils A4–A7 and the resistor and field shunt control relay 102. The open loop signal developed across the resistor 534 in response to the minimum shunt signals is also coupled through a conductor 537 and a diode 539 to the minimum shunt signal generator 120 of FIG. 6. The presence of the signal across the resistor 534 prevents the minimum shunt signal generator 120 from being turned on.

To summarize the operation of the motor control system of this invention at this point, at the start of propulsion, for example, the firing of the diverter circuit is first fully advanced and is then progressively retarded as it shunts the field winding during successive timing cycles, allowing the field current to gradually build up. When the diverter firing is fully retarded, that is, when the diverter is shunting field windings for a preseletced minimum portion of a timing cycle, minimum shunt signals are coupled through the conductor 174 to turn on the controlled rectifier 516. At the same time signal generator 172 provides output signals which are coupled through the contact arm 400 and the conductor 342 to turn on the controlled rectifier 314 and begin energizing the relay coil A8. The contact arm movement signal developed across the resistor 534 is coupled through the conductor 180, signifying that the contact arms 68 and 70 in FIG. 1 have been told to connect the diverter circuit 30 for resistor shunting.

When the relay coil A8 in FIG. 4 is energized and these contact arms 68 and 70 move toward the terminals A8A and A8B, the contact arm 518 in the anode circuit of the controlled rectifier 516 (in FIG. 4) moves as well. The controlled rectifier 516 is turned off before its anode voltage is restored by the contact arm 518. The contact arm movement signal thus terminates, signifying that these contact arms have moved and that the regulator circuit of FIG. 8 should begin controlling changes in the series armature resistance.

The firing of the diverter circuit 30 (FIG. 1) is first fully retarded and then progressively advanced during successive timing cycles until it is fully advanced, that is, until the diverter shunts the resistor 60 in FIG. 1 for a predetermined maximum portion of a timing cycle, at which time its effective resistance in the armature circuit has been decreased by an amount equal to the resistance of the resistor 54. A maximum shunt signal is coupled from FIG. 6 through the conductor 176 to turn on the controlled rectifier 369 of FIG. 4. The contact arm movement signal developed across the resistor 528 is coupled through the conductor 370 to turn on the controlled rectifier 406 and to begin energizing the relay coil A4. At the same time a contact arm movement signal is conducted through diode 536 and conductor 180 to the pulse circuit of FIG. 8.

When the relay coil A4 is sufficiently energized, it causes the contact arm 46 to move and shunt out the resistor 54 in FIG. 1. Simultaneously, the contact arm 526 in the anode circuit of the controlled rectifier 369 (of FIG. 4) breaks contact with the contact A4C to remove the anode voltage from this controlled rectifier. Before the anode voltage is restored, the controlled rectifier 369 turns off, thereby terminating the contact arm movement signal and allowing the regulator in FIG. 8 to continue decreasing the series armature resistance. In a similar manner contact arm movement signals are generated when each of the remaining of the armature resistors 39 is to be shunted out and when, at high speeds, diverted circuit 30 is switched from resistor shunting to field shunting once again.

Take note that the contact arm 522 in the anode circuit of the controlled rectifiers 369 and 516 makes contact with the contact A6B when the relay coil A6 is energized to cause the contact arm 50 of FIG. 1 to shunt resistor 58. Previously, in the resistor shunting sequence, the resistors 54 and 56 had been sequentially shunted out of the power circuit.

During propulsion the contact A6B of FIG. 4 is connected through the contact arm 260 of FIG. 3 and conductor 544 to the contact arm 520. Therefore, the propulsion cycle can continue by fully shunting out the last resistor of the power circuit and going into the field weakening at high speeds. However, during braking cycle the contact A6B is connected through the conductor 546 to the pulse producing circuit 110 of FIG. 5 to turn off the maximum shunt signal generator for the remaining portion of the braking cycle. Therefore, the relay coil A7 cannot be energized to cause the contact arm 52 of FIG. 1 to shunt out the armature resistor 60, and the braking cycle does not progress through field weakening at low speeds.

Firing signal advance and retard control

Referring now to FIG. 5, means are provided for developing the firing signal timing control voltage at the conductor 140 in response to the regulator output at the bleed line 148 and in response to the output of the pulse producing circuit 108. The firing signal timing control voltage is developed across a resistor 548 while alternating-current ripple detect by motor characteristic measuring means 157 is filtered from the timing control voltage by a capacitor 550. A breakdown voltage device 552 limits the voltage level which can be developed across the capacitor 550 and thus limits the amount the generation of the firing signals in FIG. 6 can be advanced. A slide wire 554 of a rheostat 556 connected between the resistor 548 and the conductor 140 is adjusted to control the voltage developed across the capacitor 550 when this capacitor is shunted by the transistor 483 during changes between resistor and field shunting and when armature resistors are shunted out of the armature circuit.

The pulse circuit 108 of FIG. 5 sets the initial operating conditions of the diverter circuit 30 (FIG. 1) at the start of motoring and braking. It raises the voltage level across the capacitor 550 to its highest possible level, fully advancing the generation of firing signals and thereby limiting the initial excitation of the motor field windings to zero excitation or to some other predetermined minimum level. The pulse producing means 108 comprises two portions, the first portion being a resistor-diode leg which initially fully charges the capacitor 550 and the second portion being a pulse circuit which controls the maximum rate of discharge of the capacitor 550 and thus controls the rate at which the generation of the firing signals is progressively retarded after startup.

The resistor-diode leg comprises a resistor 558 which connects the conductor 106, leading from the circuit 104 of FIG. 3, through a diode 560 to the filter capacitor 550. At startup, the voltage at the conductor 106 is connected through this leg to the capacitor 550. This voltage is available essentially at the time when coil A1 (FIG. 3) is energized and disappears when arm 86 (FIG. 1) and arm 136 (FIG. 3) move in response to this energization.

The second portion of the pulse producing means 108 comprises a pulse circuit which is similar to the pulse circuit 486 of FIG. 8 and thus to the pulse producing means described in my issued U.S. Pat. 3,257,597 cited above. This pulse producing circuit comprises a transistor 562 having an emitter electrode connected through a rheostat 564 and a diode 566 to a regulated voltage line. The collector electrode of the transistor 562 is connected to the junction of the resistor 548 and the filtering capacitor 550. The base electrode of this transistor is biased by a circuit which includes a resistor 568, diodes 570, 572, 574 and 576, capacitor 578, and a resistor 580. At the start of a propulsion cycle, for example, the diode 574 couples the initial operating condition signal from conductor 106 to the junction of capacitor 578 and the resistor 580. Since the voltage level of the unregulated voltage source at terminal 96 is larger than the regulated voltage level energizing FIG. 5, the capacitor 578 is discharged through the diode 574 and the diode 572. The level to which this capacitor is discharged is limited by the resistors 268 (FIG. 3) and 580 and the diode 576 which connects this capacitor to the regulated line source.

Once the capacitor 578 has been discharged as described and 106 is de-energized, the transistor 562 is turned on, coupling a voltage to the capacitor 550 which limits this capacitor's charge rate. When the voltage at the conductor 106 terminates, say with the closing of the propulsion circuit, the capacitor 578 begins to charge through the transistor 562 and the resistor 580. As this capacitor charges it begins to turn on the transistor 562, thus preventing capacitor 550 from discharging at a rate faster than that controlled by resistor 580 and capacitor 578, which rate thereby controls the generation of firing signals in FIG. 6.

To summarize briefly, at the start of a propulsion cycle the pulse producing means 108 fully charges the capacitor 550 to fully advance the generation of the firing signals. As soon as the propulsion circuit is closed, pulse producing means 108 controls the capacitor 550 discharge rate, thereby gradually retarding the generation of the firing signals in successive timing cycles to allow the field windings of the controlled motors to be more fully energized. At the start of braking, the circuit 108 responds in a similar manner to the energization of relay coil A10 and the subsequent movement of contact arm 308 in FIG. 3.

The circuit 150 of FIG. 5 determines whether an increase in the current of the regulator output bleed line 148 (from FIG. 8) increases or decreases the voltage across the capacitor 550. This circuit comprises transistors 582, 584 and 586 which control one path of charging current for the capacitor 550. Basically, the state of conduction of the transistor 586, as determined by the signal level at a conductor 588, determines whether an increased current flow through the bleed line 148 causes the capacitor 550 to charge or discharge, tending to advance or retard, respectively, the generation of firing signals. As a signal at the conductor 558 turns on the transistor 586, current flows through the emitter and base electrodes of the transistor 584 and through a resistor 590 and the base circuit of the transistor 584 to turn on this transistor. At this time current is shunted from the emitter and base electrodes of the transistor 582 through the diode 592 and a resistor 594 to turn off this transistor. As the regulating action by the regulator circuit of FIG. 8 increases the current flow through the conductor 148, away from the emitter electrode of the transistor 584, the current passed through the collector of the transistor 584 is reduced, decreasing the voltage level at the capacitor 550 and the conductor 140. This retards the generation of firing signals by the oscillator 132 in FIG. 6.

The absence of signals at the conductor 588 turns off the transistors 586 and 584 and allows the transistor 582 to turn on. When the regulating circuit in FIG. 8 begins to regulate, increasing the current flow through the conductor 148 out of the control circuits in FIG. 5, the transistor 582 is turned on proportionately to increase the voltage across the capacitor 550 and at the conductor 140, thereby advancing the generations of firing signals by the oscillator 132 in FIG. 6.

FIG. 4 contains means for determining whether the generation of firing signals is advanced or retarded in response to output signals from the regulator circuit in FIG. 8. In the upper right hand portion of FIG. 4, the contact arm 330 and a diode 596 and the contact arm 368 and a diode 598 determine whether the conductor 588 is energized to retard the firing with the regulator output, or whether this conductor is de-energized to advance the generation of firing signals with the regulator output. Throughout resistor shunting, the contact arm 330 makes contact with a contact A8C to energize the conductor 588 through the diode 596. During the high speed field weakening portion of a propulsion cycle, the contact arm 368 energizes the conductor 588 through the diode 598. Since a timed pulse from the pulse circuit 108 controls the duration of firing signals during field shunting at the start of propulsion, and the signal level of the armature current is very low at this time (not in regulation), the signal level at the conductor 588 is unimportant at the start of propulsion.

From the above it can be seen that during resistor shunting and during high speed field weakening of the propulsion cycle, the generation of firing signals is retarded in response to an increased output of the regulator in FIG. 8. The same is true during the resistor-shunting portion of the braking cycle. However, during the field-shunting at the start of high speed braking, an increased output from the regulator advances the generation of firing signals.

Timing cycle generator

The free running, relaxation oscillator 130 (FIG. 6) generates a commutating signal for the terminals 80 and 82 of FIG. 1 at the end of each timing cycle. This oscillator comprises a unijunction transistor 600 which is controlled by a timing circuit comprising a capacitor 602, a rheostat 604 having a slide wire 606, a resistor 608, and a diode 610. When the capacitor 602 is charged through the rheostat 604 and resistor 608 to the breakdown voltage level of unijunction transistor 600, the unijunction transistor 600 is fired, discharging the capacitor 602 through a resistor 612. In one application of this invention, the slide wire 606 of the rheostat 604 is adjusted so that the capacitor 602 was discharged within a preferred frequency range of approximately 40 to 100 cycles per second. However, the frequency of the timing cycle can be adjusted to suit any application of this invention.

Discharging the capacitor 602 turns on a transistor 614, which discharges a capacitor 616 through the primary winding 618 of a pulse transformer 620 to provide the commutating signals. Prior to the firing of the transistor 600, the capacitor 616 is charged through a resistor 622. A breakdown voltage device 624 limits the voltage level across the primary winding 618 and thus limits the size of the commutating signals.

A secondary winding 619 of the transformer 620 is connected to the auxiliary energy source for the commutating capacitors of the current diverter 30 of FIG. 1. A pulse coinciding with each commutating pulse is coupled to the auxiliary energy source. After a predetermined delay, which allows commutation of the controlled rectifiers 74 and 238 to occur, this pulse is effective to cause charging of the capacitors 224 and 222 to a preselected voltage level of the auxiliary energy source if the latter voltage level is higher than capacitor 224 voltage at the conclusion of the commutation cycle.

Firing signal generator

The oscillator circuit 132 generates a firing signal at a controllable time interval after the generation of a commutating signal, this interval being controlled in response to the voltage level at the conductor 140. The oscillator circuit 132 comprises a unijunction transistor 626 which is fired when the voltage level across a capacitor 628 reaches the breakdown voltage level of this transistor. At this time the capacitor 628 is discharged through a resistor 630 to turn on transistor 632, which in turn discharges a capacitor 634 through a primary winding 636 of the pulse transformer 638 to produce a firing signal.

The capacitor 628 is charged by a timing signal produced by the combination of it and a rheostat 640, a resistor 642 and a diode 644 and by a control signal produced by the circuit 646 in response to the signal level at the conductor 140. The control signal very rapidly charges the capacitor 628 to the control signal level determined by the voltage level at the conductor 140. The timing signal increases the voltage level across the capacitor 628 at a rate determined by the setting of a slide wire 648 of the rheostat 640.

The control signal circuit 646 comprises transistors 650 and 652, a potentiometer 654, resistors 656 and 658, and a diode 660. An increase in the signal level of the conductor 140 increases the current flow through the transistor 650 and 652 and increases the voltage level across the potentiometer 654. Therefore, current that flows through the resistor 658 and diode 660 increases the voltage level across the capacitor 628 to cause the unijunction transistor 626 to fire sooner in a timing cycle and thus advance the generation of the firing signals. A decrease in the signal level at the conductor 140 tends to turn off the transistors 650 and 652, thereby decreasing the voltage level at the potentiometer 654, firing the unijunction transistor 626 later in the timing cycle to retard the generaion of firing signals.

The synchronizing circuit 138 synchronizes the generation of firing signals with the generation of the commutating signal by, at the end of each timing cycle, fully discharging the capacitor 628 upon the generation of a commutating signal. This circuit basically comprises the transistor 614 and a second transistor 662. When a commutating signal is generated, both of the transistors 614 and 662 are turned on, thereby discharging the capacitor 628 through the collector and emitter electrodes of the transistor 662. When the generation of the commutating signal has terminated, the transistor 662 is turned off to allow the capacitor 628 to be charged by the control signal and the timing signal as discussed above.

Sensing circuits

Means are provided for determining when the generation of firing signals, and thus the firing of the controlled rectifier 74 of FIG. 1, is fully advanced and when the generation of firing signals is fully retarded. That is, these means determine when the diverter circuit 30 of FIG. 1 is performing its shunting operation for a maximum or a minimum percentage of the timing cycle, respectively.

The maximum retarded (or minimum shunting) condition is sensed by means including the emitter circuit of the transistor 632 in the primary circuit of the firing pulse transformer 638, along with the signal generating circuit 120. A unijunction transistor oscillator 664 generates minimum shunting signals, which are carried to FIG. 4 by the conductor 174, unless a timing capacitor 666 has been shunted by a circuit component such as the transistor 668. This transistor is biased by the emitter circuit of the transistor 632, which includes a resistor 670, a diode 672, and a capacitor 674. Each time that the transistor 632 conducts to produce a firing signal, the diode 672 couples a signal to the base circuit of the transistor 668 to turn on this transistor and discharge the capacitor 666. If the generation of the firing signal is retarded beyond a selected synchronization time, capacitor 674 discharges and transistor 668 turns off. The charge across the capacitor 666 is allowed to reach the breakdown voltage level of a unijunction transistor 676 in the oscillator 664 to produce a minimum shunting signal. As explained above, the minimum shunting signals control the energization of relay coils A4–A7 and the relay 102 in FIG. 4 which aid in controlling the armature current level of the controlled motors.

A similar circuit controls the generation of maximum shunt signals which are carried to FIG. 4 by the conductor 176. This circuit comprises means including a breakdown voltage device 678, a potentiometer 680, and a transistor 682 which respond to the voltage level across the potentiometer 654 and the resistor 656 in the control circuit 646. When the voltage level across the potentiometer 654 and resistor 656 reaches a preselected maximum amount, signifying that the generation of firing signals is fully advanced, the transistor 682 turns on to turn off a transistor 684 which had been shunting charging current from a capacitor 686 of the unijunction transistor oscillator 688.

The capacitor 686 can now be charged to fire the oscillator 688. Maximum shunt signals are thus generated to indicate that the generation of firing signals is fully advanced. The maximum shunt signals are used to control the energization of relay coils in FIG. 4 which aid in controlling the armature current level of the controlled motors.

To prevent a premature energization of one of the relay coils A4–A9 of FIG. 4, the pulse producing circuits 110 and 112 of FIG. 5 prevent maximum and minimum shunt signals from being generated at the beginning of propulsion and braking cycles. Furthermore, the circuit 110 is energized during braking to prevent maximum shunting signals from being generated after a preselected number of armature resistances (of FIG. 1) have been shunted by their corresponding contact arms.

The pulse circuit 110 comprises timing means including a capacitor 690 which is charged by the unregulated source voltage (at terminal 96 of FIG. 3) when initial operating signals are generated through the conductor 106 and a diode 692 at the start of propulsion or braking, or through the conductor 546, a resistor 694 and a diode 696 when a preselected number of armature resistors in the power circuit of FIG. 1 have been shunted during braking. While input signals are present at the pulse circuit 110 and for a preselected time thereafter, an output is coupled through a resistor 698 and a diode 700 and the conductor 114 to forward bias the transistor 684 of FIG. 6, thereby holding off the maximum shunt signal generator 116.

A pulse circuit 112 comprises timing means, including the capacitor 702, charged by the unregulated voltage source (of FIG. 3) and through the conductor 106 and a diode 704 when the initial operation signal is produced in FIG. 3. During the presence of the initial operating signal and for a predetermined time thereafter based on the discharge time of the capacitor 702, current flowing through resistors 706 and 708 forward biases a transistor 710 causing it to turn off the minimum shunt signal generator 120 in FIG. 6 by shunting current away from the timing capacitor 666.

Commutation energy control

The circuits shown in FIG. 7 respond to the initial operating signals coupled through the conductor 106 and respond to charging current signals developed in a transformer 133, connected in the circuit of the energy storage means 84 of FIG. 1, to assure that the energy storage means 84 is charged to the maximum degree available for existing conditions. The pulse circuit 122, which is similar to the pulse circuit 486 shown in FIG. 8 and the pulse circuit 108 of FIG. 5, responds to the signals coupled through the conductor 106 to discharge a capacitor 712. While this capacitor is charging a transistor 714 is turned off. For a predetermined time after the signal at the conductor 106 has terminated, while the capacitor 712 is charging, the transistor 714 is turned on to produce an output pulse of positive polarity at the conductors 124 and 125.

A positive polarity pulse at the conductor 125 turns on transistors 716 and 718, which in turn hold off the commutating signal generator 130 and the firing signal generator 132, respectively, by shunting current from them which normally would be effective to turn on the unijunction transistors in these oscillators. At this time, the diodes 610 and 644 in the oscillators 130 and 132, respectively, are reverse biased to further prevent any current flow which might produce a timing signal. Capacitors 611 and 645 at diodes 610 and 644 provide a reduction of voltage at capacitors 602 and 628, respectively, at the time oscillators 130 and 132 are held off, thereby preventing an accidental firing by a transient voltage at this time.

The presence of a charging current in the primary winding of the transformer 133 (in the energy storage means 84 of FIG. 1) has the same effect as the signal at the conductor 106. The polarity of the signal produced in the secondary winding of the transformer 133 forward biases a diode 720 to turn on the transistors 716 and 718 and thereby hold off the generation of commutating signals and firing signals for the diverter circuit 30 of FIG. 1. When the flow of charging current for the energy storage means has terminated or reached a selected low value, the transistors 716 and 718 are turned off to allow the generators 130 and 132 to provide the appropriate signals to the diverter circuit. As set out above, in the general description of the control circuits, the circuit shown in FIG. 7 prevents an unsuccessful attempt to commutate the controlled rectifiers 74 of FIG. 1 which would result in a failure of the motor control system.

Stabilizing circuits

Figure 9:
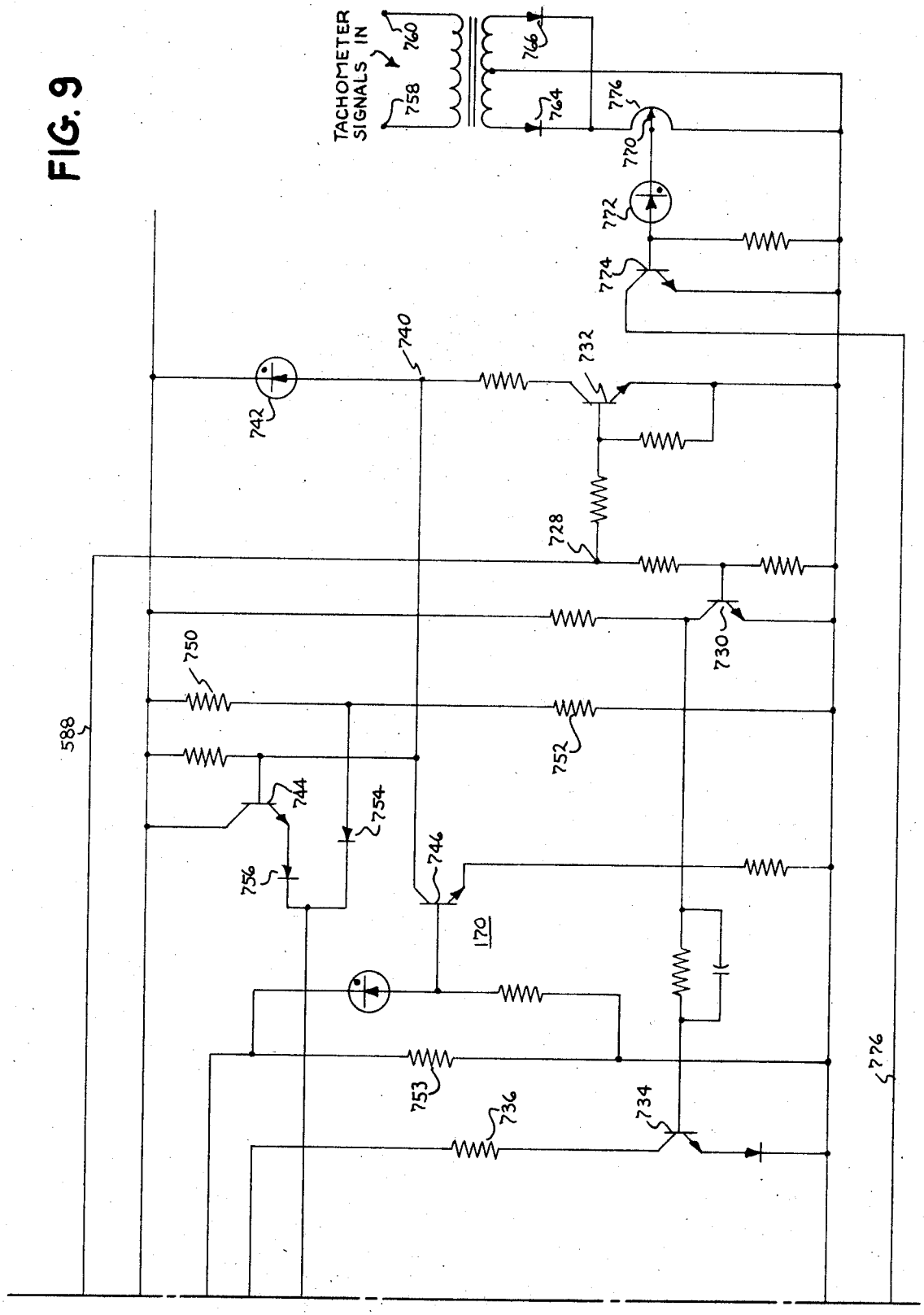
FIG. 9 is a schematic diagram of a stabilizing circuit and a high speed braking control circuit.

Referring to FIG. 9, along with FIG. 6, the stabilizing circuit 170 comprises a phase lead circuit which compensates for the phase lags caused by the inductive nature of the power circuit of the motor control system of this invention and caused by filters in the control circuits which remove alternating-current ripple signals from the control voltage. When the regulated parameter, the armature current or voltage, changes, the phase lead circuit senses the rate of change and decreases this rate of change to prevent unstable oscillations or hunting by the system. To provide the appropriate phase lead to compensate for the slow response of the system, a voltage, proportional to either the armature current or armature voltage, is coupled from the load signal line 154 of FIG. 8 and through the conductor 168 to a derivative network in FIG. 6, comprising a resistor 722 and a series capacitor 724, which develops a signal proportional to the rate of change at a junction 726.

During the resistor shunting portion of the propulsion and braking cycles and the high speed field shunting portion of the propulsion cycle advancing the generation of firing pulses tends to increase the generated tractive effort. The stabilizing network 170 then must retard the generation of firing pulses as a function of the rate of any increase of, say, the regulated armature current, and must advance the generation of firing pulses as a function of the rate of any decrease in the armature current. For example, as the diverter circuit 30 of FIG. 1 provides armature resistor shunting, advancing the firing of the controlled rectifiers 74 decreases the effective series armature resistance, tending to increase the armature current and thus increase the generated tractive effort. In order to slow down this rate of increase of the armature current so that the current does not appreciably overshoot the regulated current level, the phase lead network has a retarding effect on the firing of the controlled rectifiers 74.

However, retarding the generation of firing pulses tends to increase the regulated armature torque during field excitation control at the start of the propulsion and braking cycles since this increases field excitation. The stabilizing network 170 must then advance the generation of firing pulses as a function of the rate of any increase of the regulated parameter and retards the generation of firing pulses as a function of the rate of any decrease in the regulated parameter. The effect is to introduce a phase lead into the motor control system and thereby prevent unstable oscillation or hunting due to the lagging response of the system to errors occurring in the generated tractive effort.

The presence and absence of a signal on the conductor 588 of FIGS. 4 and 5 determines whether stabilizing network 170 retards or advances, respectively, the generation of firing signals as a function of the rate of increase of, say, the armature current. It will be recalled that a signal is present at the conductor 588 during resistor shunting, when the contact arm 330 of FIG. 4 engages the contact A8C to forward bias the diode 596 and is present during the high speed field shunting portion of a propulsion cycle when the contact arm 368 engages the contact A7E to forward bias the diode 598.

A signal at the conductor 588 is coupled to a junction 728 of FIG. 9 to turn on a pair of transistors 730 and 732. With the transistor 730 turned on, a transistor 734, connected through a resistor 736 to the base electrode of a transistor 738 in the base circuit of a unijunction transistor 626 of FIG. 6, is turned off. Turning on the transistor 732 biases a junction 740 at a voltage level equal to approximately half of that of the regulated source, the voltage level at the junction 740 being established by a breakdown voltage device 742, which now turns off a pair of transistors 744 and 746. Therefore, when a signal is present at the conductor 588, the differentiated load signal line voltage at the junction 726 controls the base-to-base voltage of the unijunction transistor 626 without interference from the transistors 744 and 746 of FIG. 9.

When a signal is present at conductor 588, a junction 748 of FIG. 6 is biased at a voltage level which remains above the voltage level at the junction 740 of FIG. 9, having a lower limit determined by a voltage divider comprising resistors 750 and 752 and a diode 754. The steady state voltage level at the junction 748 is determined by a voltage divider including resistors 751 and 753 in the base circuit of transistor 738. This voltage level is raised to retard the generation of firing signals by positive going signals from the differentiating network comprising the resistor 722 and the capacitor 724, which signals indicate an increase is occurring in the regulated parameter. As a result, the voltage level at the junction 726 is raised to more fully turn on the transistor 738, tending to retard the firing of unijunction 626 to lower the rate at which the tractive effort increases. A negative going input at the junction 726, caused by a decreasing regulated parameter, has an opposite effect, that is, it advances the generation of the firing signals by decreasing the base-to-base voltage of the unijunction transistor 726. This lowers the rate at which the tractive effort decreases during resistor shunting and high speed field weakening.

An absence of signals at the conductor 588, at the start of a propulsion or braking cycle, turns off the transistors 730 and 732 of FIG. 9. At this time the transistor 734 is turned on by the higher voltage at the collector electrode of the transistor 730, thereby clamping the base electrode of the transistor 738 of FIG. 6 to a voltage level which keeps it turned off. With the transistor 732 turned off, the voltage level at the junction 740 no longer biases the transistors 744 and 746 in an off condition. The transistor 746 now responds to the derivative of the regulated armature current signal or armature voltage signal. The output of this transistor 746 controls the state of conduction of the transistor 744, which now through its emitter elecrode and a diode 756 controls the voltage level at the junction 748. The effects of the rate responsive voltage at the junction 726 on the generation of the firing pulses are reversed from its effects when the transistor 738 was turned on.

That is, during field shunting at the start of the braking cycle, for example, an increase in the regulated armature voltage produces a voltage at the junction 726 having a rise from steady state level proportional to the rate of increase in the armature voltage. This tends to turn on the transistor 746, decreasing the voltage level at the base electrode of the transistor 744, and thereby decreasing the voltage level at the junction 748 of FIG. 6. Thus, the generation of firing pulses is advanced as a function of the rate of increase of the armature current, reducing the field excitation and thereby the rate of rise of the generated tractive effort. A decreasing armature voltage has the opposite effect, turning off the transistor 746 and thereby turning on the transistor 744 to increase the voltage level at the junction 748 to retard the generation of firing signals. The rate of fall of the tractive effort is thus reduced.

High speed braking control circuit

During dynamic braking the controlled series traction motors act as series generators, the output of which is dissipated in the armature resistors to provide braking forces: negative tractive effort. At high motor speeds the series traction motors generate their full output voltage only after a delay time charaiteristic of series generators. This delay time would permit the diverter controlled dynamic braking to proceed through the initial field control portion of the braking cycle and into the resistor control portion in an attempt to generate the full required braking effort. Because the motor field would be fully excited and the armature series resistance partially removed from the dynamic braking circuit during this time period, when there is a rapid rise of voltage in the dynamic braking circuit, an overcurrent would occur before the motor control system could go back into field control to lower the armature current to a safe level.

Therefore, FIG. 9 also includes means for preventing the motor control system from switching from field control to resistance control above a predetermined motor speed. In the present embodiment of this invention, these means comprise a circuit which responds to the output signals of a tachometer (not shown) for preventing the signal generator 120 of FIG. 6 from generating minimum shunting signals above the predetermined speed. Since these minimum shunting signals are necessary to switch the diverter circuit 30 of FIG. 1 from field shunting to resistor shunting, this switching cannot occur and a failure-causing overcurrent condition is averted.

To provide a response at the appropriate speed, the tachometer signals are coupled through terminals 758 and 760 of the primary winding of a saturable transformer 762 which has its secondary winding connected through a full wave rectifier comprising diodes 764 and 766, to one side of a potentiometer 768. A tap 770 of the potentiometer 768 is coupled through a break down voltage device 772 to the base circuit of a transistor 774 which has its collector and emitter electrodes connected, through a conductor 776, across a timing capacitor 666 (of FIG. 6) in the signal generator 120. The setting of the tap 770 of potentiometer 768 causes the breakdown voltage device 772 to turn on the transistor 774 above speeds at which the slow system response during dynamic braking causes the overcurrent condition referred to above. Over this range of high speeds, the transistor 774 shunts charging current away from the capacitor 666 of FIG. 6 to hold off the generation of minimum shunting signals. At lower speeds the control circuits can advance into armature resistance control without a need to return to field control to compensate for overcurrents.

Separate field and resistor shunting diverters

Figure 11:
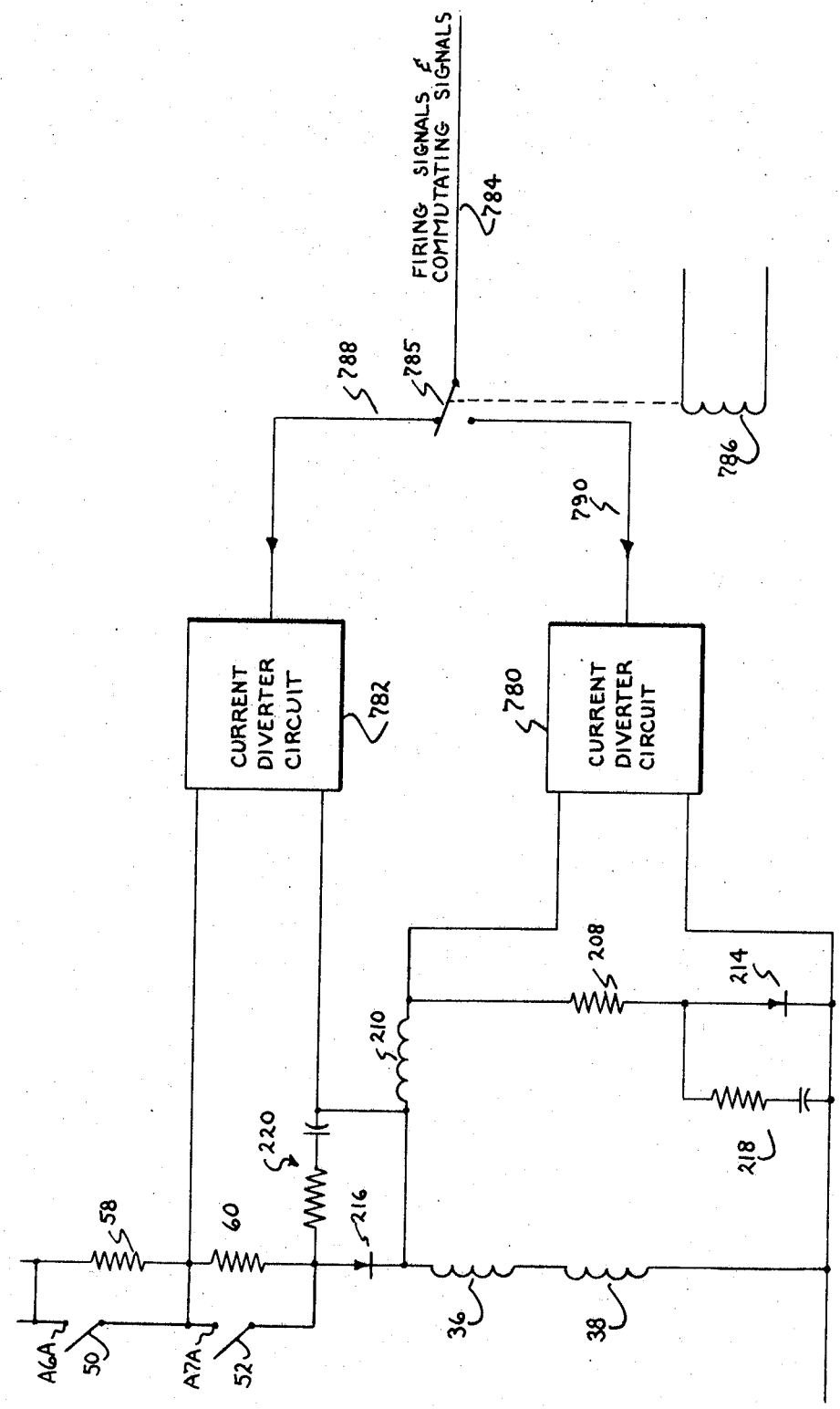
FIG. 11 is a schematic diagram of a modification of this invention in which separate diverter circuits are used for field shunting and for resistor shunting.

FIG. 11 shows a schematic diagram of an alternative diverter arrangement in which more than one of the current diverter circuits is used, in the illustrated embodiment one being used for field shunting and the other for armature resistor shunting. The firing and commutating signals, or as an alternative the firing signals only, are switched from one diverter to the other to change between field shunting and armature resistor shunting. Thus, a current diverter circuit 780 is connected across the resistor 208 and the diode 214 to provide field shunting, while a current diverter circuit 782 is connected across the diode 216 and the armature resistor 60 to provide armature resistor shunting. The single diverter circuit 782 is still controlled, as shown in FIG. 1, along with the resistor shunting switches, in a manner causing it to gradually change the series armature resistance.

FIG. 11 shows in a schematic manner how the firing and commutating signals are coupled from the control circuits. A conductor 784 and a contact arm 785 couple them to either of the current diverter circuits 780 and 782. A relay (or relays) represented by a relay coil 786, is energized to couple the firing and commutating signals either through a conductor 788 to the current diverter circuit 782 or through a conductor 790 to the diverter circuit 780. As an alternative, the commutating signals can at all times be coupled to both of the diverter circuits 780 and 782, with the firing signals alone being switched to one or the other of the diverter circuits by the contact arm 785. The commutating signals would continuously cause the capacitors in the commutating circuits to charge and discharge. The relay represented by the coil 786 may comprise any convenient type, such as the over-center, toggle type relay 102 of FIG. 4 which controls changes between field shunting and armature resistor shunting.

Since the contact arm 785 of the relay 786 does not carry and break the high currents which flow through the contact arms 68 and 70 of the relay 102 of FIG. 4, the relay 786 can be much smaller and faster acting than the relay 102. In some applications of this invention, more than two diverter circuits may be used to control the torque. For example, where two sets of two traction motors are used, each set having its fields connected in series with the armatures for this set, a separate diverter circuit is used for each set of fields. However, each of the field-shunting diverters is used in the same manner as the diverter circuit 30 of FIG. 1. Any resistor shunting diverter circuit is controlled in conjunction with one or more resistor-shunting switches to gradually change the series armature resistance as explained above.

Pre-positioning control circuit

The motor control system described above begins a tractive effort cycle, propulsion or dynamic braking, at any speed by following a fixed control sequence which begins with field excitation control and proceeds through armature resistance control. While this type of control is highly satisfactory for many applications of this invention, it has one drawback for other applications which is obviated by the addition of the control circuit shown in FIG. 12.

Using the dynamic braking mode of control as an example, if the motor speed is low at the start of braking, the armature resistance value must also be at an appropriately low level to allow the controlled motors, now acting as series field, direct-current generators, to provide the amount of armature current required for the desired level of negative tractive effort or braking torque. The motor control system described above reaches this lower armature resistance value after braking is called for by first gradually increasing the field excitation and then gradually decreasing the armature resistance by shunting out a number of the armature resistors one by one. The regulator circuit limits the maximum rate at which the field excitation can be increased and the armature resistance decreased, and the sluggish response of the resistor-shunting contact arms further limits the rate of building up braking. Therefore, there is a delay in building up the negative tractive effort and in reaching the desired braking level.

Figure 13:
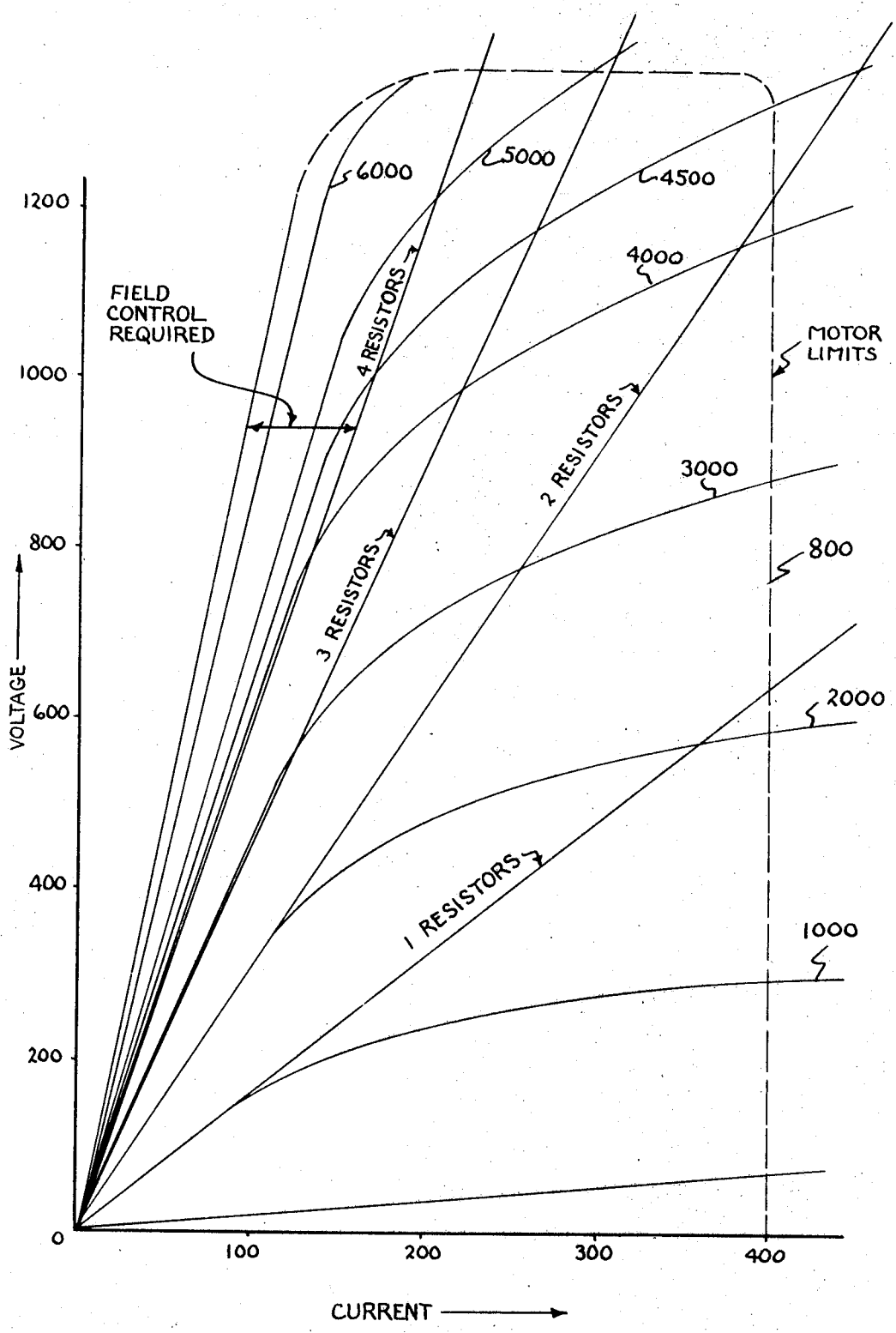
FIG. 13 illustrates the voltage-current characteristics of a D-C series motor during dynamic braking.

FIG. 13 shows the dynamic braking characteristics of typical series field motors used in FIG. 1, with the dashed line 800 enclosing the permissible volt-ampere operating limits of the motors. These characteristics show that for each motor speed a corresponding minimum armature resistance must be maintained to retain control of the motors. That is, the resistance of the unshunted armature resistors remaining in the armature circuit plus the effective resistance of the diverter-shunted armature resistor must equal this critical resistance for the motor speed and degree of machine saturation representing the desired armature current or negative tractive effort level.

Figure 12:
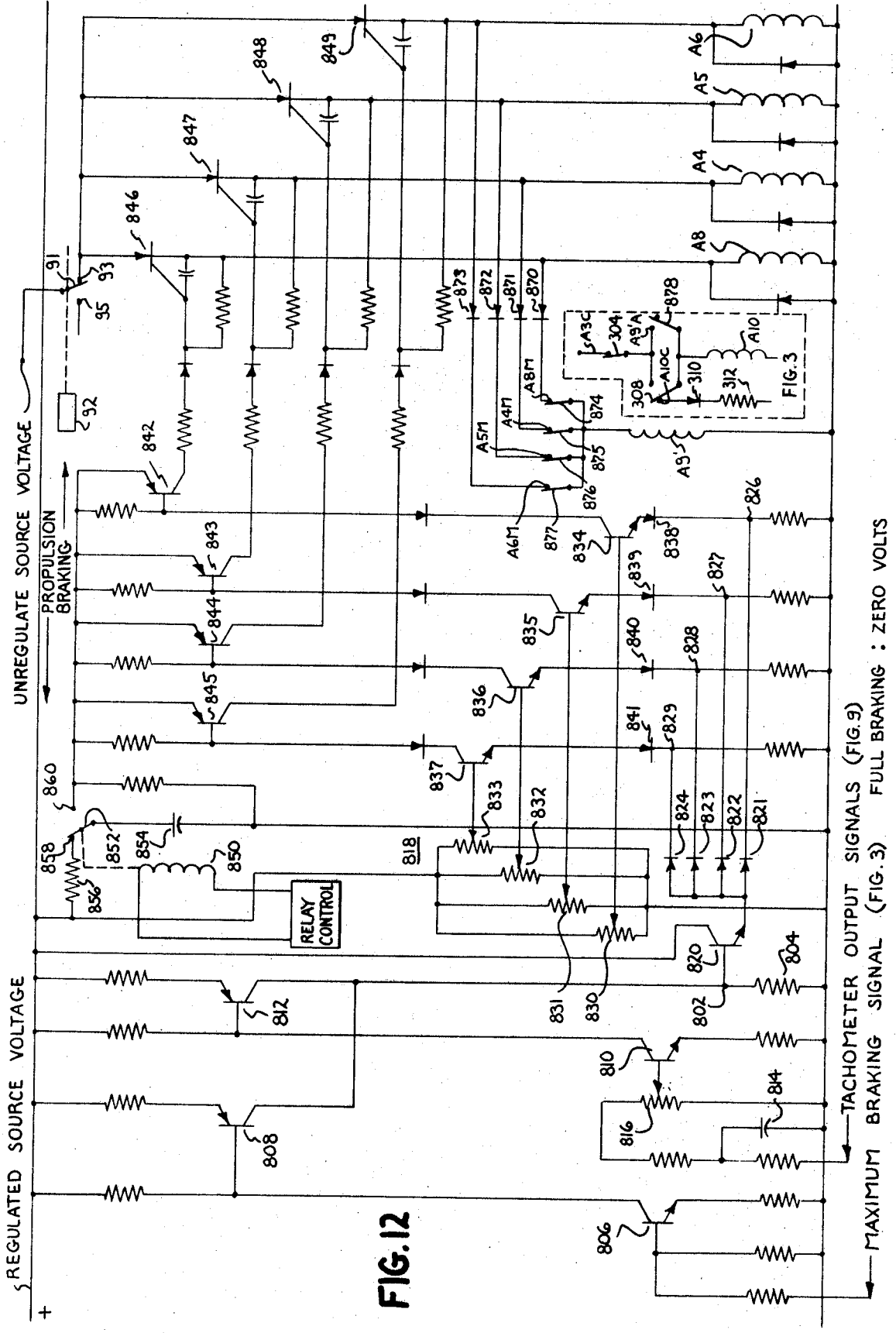
FIG. 12 is a schematic diagram of a circuit which determines where in a control switch sequence a braking cycle begins.

In accordance with still another feature of this invention, the delay in building up the desired tractive effort is avoided without losing control of the motors through the use of the control circuit in FIG. 12. This circuit comprises means responsive to a signal which varies with the speed of the controlled motors and to a signal which varies with the desired tractive effort level for switching out of field control and eliminating a number of armature resistors from the armature circuit immediately when a change is required in the generated tractive effort level. The desired current level can then be secured and maintained by controlling the shunting action provided by the current diverter alone, or possibly in conjunction with a single change in number of armature resistors in the circuit.

Figure 14:
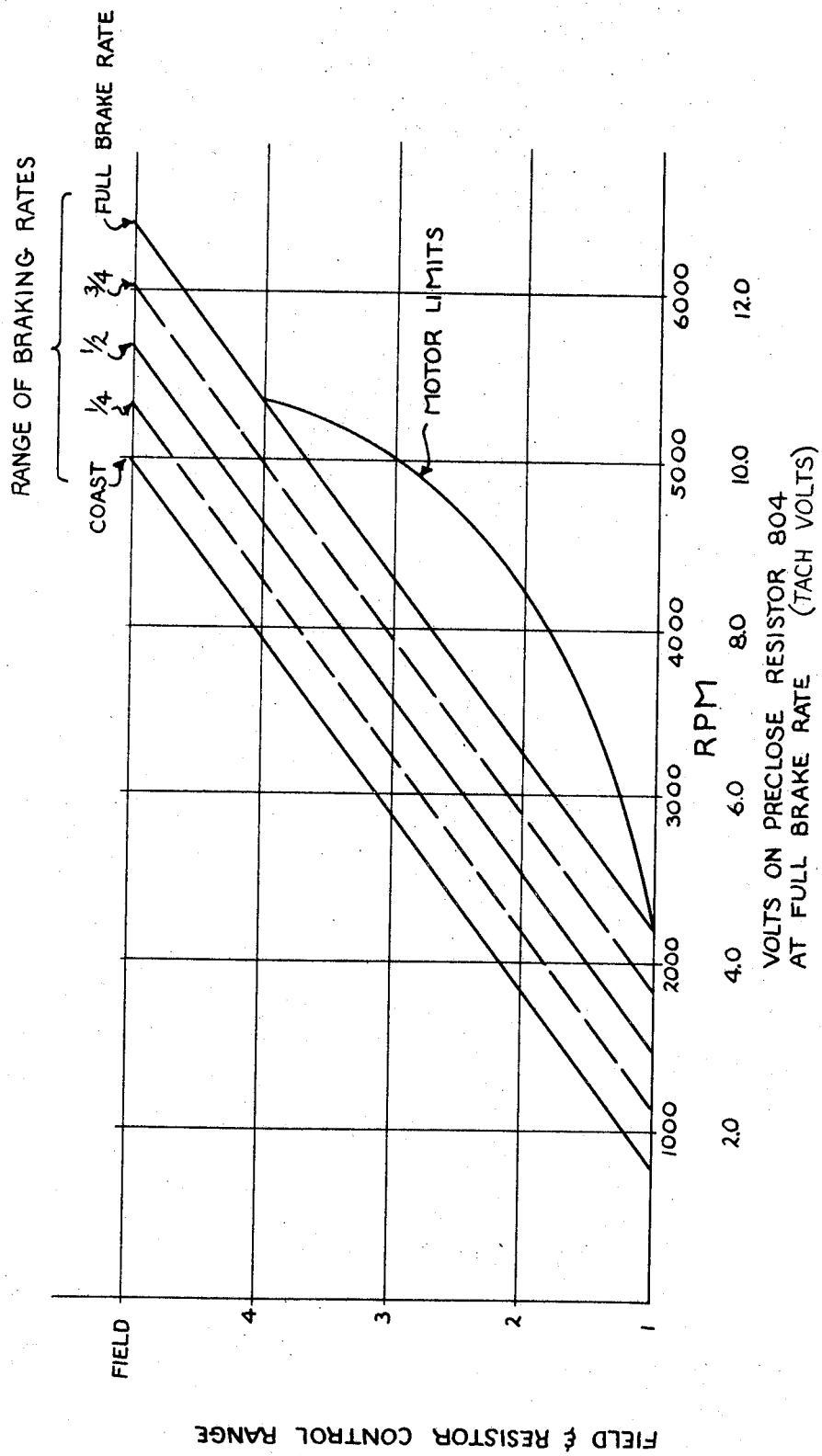
FIG. 14 illustrates the relationship between various brake rates and the number of resistors remaining in the armature circuit at various motor speeds.

FIG. 14, derived from FIG. 13, shows how many of the original four armature resistors which the control circuit of FIG. 12 allows to remain in the armature circuit when a desired braking rate is called for at a particular motor speed. The sloped lines in FIG. 14 represent arbitrarily chosen linear limits of the number of remaining resistors in the armature circiut upon actuation of the control circiut of FIG. 12. The arbitrary linear limit representing the highest braking rate corresponds to only two points of the controlled motor voltage-current limitation curve: the upper and lower ends of this curve.

FIG. 12 shows a control circuit wherein signals from FIG. 9, which vary with the motor speed, and signals from FIG. 3, which vary with the desired braking rate, are combined to provide a voltage at a summation point 802. This voltage is developed across a preclose resistor 804, which controls the change from filed excitation control to armature resistance control, along with controlling the number of armature resistors removed from the armature circiut upon actuation of the control circuit. In FIG. 12 once again, the tachometer output signals from FIG. 9 are coupled through a transistor 810 and a transistor 812 to the summation point 802. A capacitor 814 filters transient signals from the tachometer output, while a rheostat 816 is used to adjust the relative effects on the voltage at the summation point 802, between changes in the level of the tachometer output signals and changes in the level of the maximum braking signals.

As the tachometer output signal level increases with higher motor speeds, the transistor 810 is turned on more fully, reesulting in a higher level of conduction for the transistor 812. This increases the voltage level at the summation point 802, across the reistor 804. The voltage scale along the abscissa of the graph in FIG. 14 shows the voltage developed across the preclose resistor 804 by the tachometer output signals from FIG. 9 at the full brake rate, that is, when the maximum braking signal level from FIG. 3 is zero volts. Increasing the voltage level across the resistor 804 tends to increase the number of armature resistors left in the armature circuit when the control circuit of FIG. 12 is actuated.

The maximum braking signal is coupled from FIG. 3 and through a transistor 806 and a transistor 808 to the summation point 802. When the maximum braking signal level is zero volts, for example, full braking is called for; the maximum braking signal level is raised as the desired braking level decreases. Raising the maximum braking signal level turns on the transistor 806 more fully, and the transistor 808 is biased on more fully. The resulting higher current flow from the transistor 808 increases the voltage level at the summation point 802, that is, across the preclose resistor 804, at each motor speed. As a result, as the braking rate decreases more resistors remain in the armature circuit over the operating speed ranges. The slanted brake rate lines in FIG. 14 show the relationship between the various brake rates and the resistors remaining in the armature circuit at various speeds.

The voltage level across the preclose resistor 804 is compared with reference voltages established by a reference voltage source 818, and as a result, this voltage level controls the energization of the relay coils A4, A5, A6 and A8 (from FIG. 4) and, in turn, causes a change from field to resistor control and armature resistors 39 of FIG. 1 to be shunted. The voltage across the reistor 804 is coupled through a transistor 820 and through diodes 821–824 to junctions 826–829, respectively. The reference voltages are established at the slide wires of the potentioimeters 830–833 in the reference source 818 and are coupled through the base and emitter circiuts of transistors 834–837 and through diodes 838–841, respectively, to the junctions 826–829.

Upon actuation of the control circiut of FIG. 12, if the reference voltage level at the slide wires of any of the potentiometers 830–833 is sufficiently greater than the voltage level at the corresponding one of the junctions 826–829, the transistor and diode between this slide wire and junction conduct current, lowering the voltage level at the collector electrode of this transistor. The positions of the slide wires of the potentiometers 830–833 are adjusted, in accordance with this illustrated embodiment, so that the transistors 834–837 begin to conduct, lowering the voltage level at their collector electrodes, in the sequence 834–837 as the voltage level at the junction 802 decreases. Therefore, none or one or more of the relay coils A8, A4, A5 and A6 is energized when the control circuit of FIG. 12 is actuated.

In accordance with the features of this invention shown in FIG. 12 of the drawings, the control circuit is actuated by providing means for temporarily energizing the gate circuits of controlled rectifiers 846–849 once braking is required. The transistors 834–837 are coupled through transistors 842–845, respectively, in the gate circuits of controlled rectifiers 846–849 which control the energization of the relay coils A8, A4, A5 and A6, respectively. The controlled rectifiers themselves are forward biased at the start of braking by coupling them through a switch, such as that switch comprising the contact arm 91 and the contact 93 from FIG. 3, which is closed at the start of a braking cycle and opened during a propulsion cycle. Means including a relay 850 controlling the movement of a contact arm 852 temporarily energize the gate circuits of the controlled rectifiers 846–849. A capacitor 854 is charged through a resistor 856 while the contact arm 852 engages a contact 858. The contact arm 852 engages a contact 860, upon the energization of the relay coil 850, to cause the charged capacitor 854 to energize the gate circuits of the controlled rectifiers 846–849. When the capacitor 854 is dishcharged, shortly after the contact arm 852 engages the contact 860, the control circuit of FIG. 12 no longer controls the energization of the relay coils A8, A4, A5 and A6. At that time the control circuits of FIG. 4 control energization of these relay coils and thus control the number of armature resistors remaining in the armature circuit.

In the present embodiment of this invention, the relay coil 850 should be energized by the relay control means 861 when braking is first initiated, such as when the contact arm 91 first contacts the contact 93, or shortly thereafter. The temporary energization of the gate circuits must occur at a time when the controlled rectifiers 846–849 are forward biased to allow it to cause energization of any of the relay coils A8, A4, A5 and A6.

When the preclose control circuit of FIG. 12 is used, the control circuits of FIG. 3 and FIG. 8 should be modified slightly to allow the regulator circuit of FIG. 8 to set the maximum rate at which the armature current can increase once the armature current begins to build up. Means must be provided for raising the voltage across the summing diode 158 to the nominal regulating voltage level of the load signal line 154 of FIG. 8. The occurrence of firing signals inthe timing cycle is thus retarded. Once the armature circuit is closed, this voltage across the summing diode 158 decreases, advancing the occurrence of firing signals in the timing cycles is thus retarded. Once the armature circuit is closed, this voltage across the summing diode 158 decreases, advancing the occurrence of firing pulses, at the discharge rate of the capacitor 490. The armature current cannot increase at a faster rate because this would increase the voltage at the load signal line 154 to the nominal level and cause regulation.

To this end, FIG. 12 includes means for energizing the pulse circuit 486 of FIG. 8 when braking is called for, causing the capacitor 490 to be charged to the nominal level. A relay coil A9' is energized through one or more of the diodes 870–873 and contacts A8M, A4M, A5M, and A6M and contact arms 874–877 when energization of one or more of the relay coils A8, A4, A5 and A6, respectively, is begun. FIG. 3 is modified by replacing the contact A9C and contact arm 306 with a contact A9'A and contact arm 878, responsive to the energization of relay coil A9' for engaging contact A9'A. In FIG. 8, conductor 106 should be joined through a diode 879 (shown in dotted lines) to the conductor 180 leading to the pulse circuit 486.

When the relay coil A9' is energized during the time that current flows through any of the relay coils A8, A4, A5 and A6, the contact arm 878 engages the contact A9'A. Referring to FIG. 3, current now begins to flow through the relay coil A10 to close the armature circuit for braking. Current also flows through the diode 310, resistor 312, conductor 106, and the diode 879 (FIG. 8) to the conductor 180 and the pulse circuit 486. The circuit 486 is now armed. When the relay coil A10 is fully energized, the contact arm 308 moves to the contact A10D. The capacitor 490 can now charge and then be allowed to begin lowering the voltage across the diode 158.

In summary, referring to FIG. 12 along with FIG. 14, the maximum braking signals and the tachometer output signals are combined to develop a voltage across the preclosed resistor 804 which determines whether the control circuits should be switched from field control to resistance control, and if so, how many of the armature resistors 39 are shorted out of the armature circuit of FIG. 1 upon actuation of the control circuit of FIG. 12.

Switching to resistance control and decreasing the armature resistance in this manner causes an immediate buildup of braking effort, eliminating any possibly undesirable delay in applying brakes, say, to a controlled vehicle.

When, for example, a full brake rate is scheduled with the motor speed at 4000 revolutions per minute, FIG. 14 shows that a voltage level of 8.0 volts is developed across the preclose resistor 804. FIG. 14 further shows that at the start of braking three armature resistors will remain in the armature circuit. Upon actuation of the control circuit of FIG. 12, the voltage across the resistor 804 reverse biases the transistors 836 and 837 to de-energize the gate circuits of the controlled rectifiers 848 and 849. At this time the transistors 834 and 835 conduct current, turning on the transistors 842 and 843 to energize the controlled rectifiers 846 and 847. The relay coils A8 and A4 are energized, switching the tractive effort control system to resistance control and shorting out the armature resistor 54 of FIG. 1. The current diverter circuit is then controlled to select the scheduled operating point on the braking characteristics by decreasing the effective resistance of the armature resistor 60. The rate at which the effective resistance is decreased, and thus the rate at which the armature current increases, is controlled by the regulator circuit of FIG. 8, as explained above.

If a brake rate equal to one-half the full brake rate is chosen, FIG. 14 shows that at 4000 revolutions per minute four armature resistors remain in the armature circuit. The 8.0 volts from the tachometer and the maximum braking signal voltage on the preclose resistor 804 reverse bias transistors 835, 836, and 837 to de-energize the gate circuits of the controlled rectifiers 847, 848 and 849. The transistor 834 conducts when contact arm 852 is actuated to engage contact 860, turning on the controlled rectifier 846. The relay coil A8 is energized to switch the control system to resistance control.

When propulsion is entered into at some motor speed, it may also be desirable to avoid having the traction control system move through the resistor control steps which do not cause the generation of a desired motor torque at this speed. Therefore, a circuit similar to the control circuit shown in FIG. 12 may be used to shunt a number of the armature resistors at the start of a propulsion cycle, this number varying with the motor speed and/or the required tractive effort level.

In this instance, however, it may be desirable to retain the field excitation control step at the start of propulsion, merely shunting out a number of resistors at the start of propulsion before beginning this field excitation control.

It is to be understood, of course, that the embodiment of this invention set forth herein is described in detail in order to present a full and clear description and that this invention is not limited to the details of the particular embodiment presented. For example, it is contemplated that this invention can be used to control the torque produced by alternating-current motors as well as the torque produced by the direct-current motors shown in the illustrated embodiment. To provide this control of alternating-current motors, diverter circuits used to control the generated torque should control the current during both half-cycles of the A-C voltage. The alternating-current motors should preferably be the series field excited type to provide a convenient method for reversing the direction of field current during alternate half-cycles of the supply voltage in an alternating-current system of this type. Other modifications obvious to those skilled in the art, would have to be made, such as removing the smoothing reactor from the armature circuit to allow the direction of current flow in the armature circuit to reverse during alternating half-cycles of operation.

As another alternative, the torque produced by the controlled motors can be controlled by signals on a number of train lines which energize relays carried by rapid transit vehicles. The relays then schedule the magnitude of the torque produced, the direction of vehicle movement, and whether the motor control system is providing propulsion or braking.

Accordingly, various changes, modifications and substitutions may be made in the embodiment described herein without departing from the true scope and spirit of my invention as defined in the appended claims.

What I claim as new and desire to secure by Letters Patent of the United States is:

1. For use in a motor control system comprising motor means having serially-connected motor armature and motor field circuits for energizing the motor means, a tractive effort control system for said motor means comprising, in combination:
   (a) Shunting circuit means comprising an inductance and a resistance connected serially across the field circuit, said inductance having a resistance value in the range from about one-fifth to about twice the resistance of said field circuit, said resistance having a resistance value substantially larger than the resistance value of said field circuit;
   (b) Current diverter means adapted to be coupled across said resistance, said current diverter means controllably providing a high impedance path and a low impedance path;
   (c) Means responsive to a preselected parameter of said motor means for progressively varying the time ratio between the occurrence of the high impedance path and the low impedance path to gradually change the excitation of field windings of the motor means independently of the armature current.

2. A tractive effort control system, according to claim 1, wherein the resistance value of said inductance substantially determines the minimum excitation of the field windings when they are excited and the resistance value of said inductance and of said resistance limit the maximum excitation of the field windings.

3. A tractive effort control system according to claim 1 wherein said diverter means includes controlled rectifying means which conduct to provide the low impedance path, and also includes means comprising energy storage means for commutating said controlled rectifying means, said tractive effort control system further comprising means for preventing current from said energy storage means from flowing through said resistance while said controlled rectifying means are being commutated.

4. A tractive effort control system according to claim 3 wherein current from said energy storage means is prevented from flowing through said resistance by rectifying means connected in series with said resistance.

5. A tractive effort control system according to claim 1 wherein said current diverter means include controlled rectifying means which conduct to provide a low impedance path across said resistance, and also include means including energy storage means for commutating said controlled rectifying means; means for charging said energy storage means to the larger of a predetermined voltage level and the voltage level which varies directly with the voltage level across said resistance when said controlled rectifying means are non-conducting.

6. A tractive effort control system according to claim 5 including means for periodically discharging said energy storage means at a preselected frequency, said tractive effort control system also including means for preventing said controlled rectifying means from conducting and said energy storage means from being discharged while the magnitude of the charging current of said energy storage means is above a preselected level.

7. For use in a motor control system comprising motor means having serially-connected motor armature and motor field circuits for energizing the motor means, a tractive effort control system for said motor means comprising, in combination:
   (a) Shunting circuit means comprising first impedance means and second impedance means connected across the field circuit, said second impedance means having a resistance value substantially larger than the resistance value of said field circuit;
   (b) Current diverter means for providing a current path between said first impedance means and the field circuit, said current diverter means controllably providing a high impedance path and a low impedance path;
   (c) Means responsive to a preselected parameter of said motor means for progressively varying the time ratio between the occurrence of the high impedance path and the low impedance path to gradually change the excitation of field windings of the motor means independently of the armature current;
   (d) said current diverter means including controlled rectifying means which conduct to provide a low impedance path across said second impedance means and means including energy storage means for commutating said controlled rectifying means;
   (e) said energy storage means being chargeable, while said controlled rectifying means are nonconducting, to a voltage level which varies directly with the voltage level across said second impedance means when said controlled rectifying means are non-conducting;
   (f) electromechanical switches including contact arms for connecting said motor means to a power source at the beginning of a propulsion cycle;
   (g) means responsive to the movement of said contact arms toward connecting said motor means to the power source for preventing said controlled rectifying means from conducting and said energy storage means from being discharged for a predetermined time interval which allows charging current to begin to flow into said energy storage means.

8. For use in a motor control system comprising motor means having serially-connected motor armature and motor field circuits for energizing the motor means, a tractive effort control system for said motor means comprising, in combination:
   (a) Shunting circuit means comprising first impedance means and second impedance means connected across the field circuit, said second impedance means having a resistance value substantially larger than the resistance value of said field circuit;
   (b) Current diverter means for providing a current path between said first impedance means and the field circuit, said current diverter means controllably providing a high impedance path and a low impedance path;
   (c) Means responsive to a preselected parameter of said motor means for progressively varying the time ratio between the occurrence of the high impedance path and the low impedance path to gradually change the excitation of field windings of the motor means independently of the armature current;
   (d) Switch means for connecting the motor means to a power source at the beginning of a propulsion cycle;
   (e) Control means for increasing the time ratio of the low impedance path to the high impedance path; and (f) Means for actuating said control means in response to said switch means connecting the motor means to the power source and thereby beginning a propulsion cycle with a minimum motor field excitation.

9. A tractive effort control system according to claim 8 wherein said switch means comprises electromechanical switches including a contact arm and said control means is actuated in response to a movement of said contact arm toward connecting the motor means to the power source.

10. A tractive effort control system according to claim 8 wherein said control means include means for progressively decreasing the time ratio of the low impedance path to the high impedance path at a preselected maximum rate after said motor means is connected to the power source, thereby increasing the excitation of said motor field windings.

11. In a motor control system comprising motor means having serially-connected armature and field circuits for energizing the motor means, a tractive effort control system comprising, in combination:
   (a) Means for establishing periodic timing cycles for said tractive effort control system;
   (b) Current diverter means controllable in response to a preselected parameter of said motor means for shunting a high level of current away from said field circuit for progressively varying portions of successive timing cycles to gradually vary the excitation of said field winding independently of the aramature current;
   (c) Electromechanical switch means including a contact arm for connecting said motor means to a power source at the beginning of a propulsion cycle;
   (d) Control means for establishing initial operating conditions for said diverter circuit means at the beginning of the propulsion cycle, said control means including means for advancing the start of the high level of current shunting in the timing cycles and subsequently allowing the start of the high level of current shunting to be retarded at a rate no higher than a preselected rate; and
   (e) Means for actuating said control means in response to the movement of said contact arm toward connecting said motor means to the power source so that the field excitation is at a preselected minimum level at the beginning of a propulsion cycle.

12. In a motor control system comprising motor means having serially-connected motor armature and motor field circuits for energizing said motor means, a tractive effort control system for said motor means comprising, in combination:
   (a) Current diverter means for shunting current away from said motor field circuit, said current diverter means being controllable for providing a high level of shunting and a lower level of shunting;
   (b) Means responsive to a preselected parameter of said motor means for progressively varying the time ratio between the occurrence of the high level of shunting and the low level of shunting of said diverter means to gradually change the field excitation of said motor means;
   (c) Control means for establishing initial operating conditions for said diverter means, said control means including means for increasing the time ratio of the occurrence of the high level of shunting to the occurrence of the low level of shunting to a preselected maximum level;
   (d) Switch means for completing said armature circuit to begin the generation of tractive effort by said motor means; and
   (e) Means for actuating said control means in response to the actuation of said switch means toward completing said armature circuit so that the field excitation is at a preselected minimum level when said current diverter means begins controlling the field excitation.

13. A motor control system according to claim 12 wherein said diverter means includes controlled rectifying means and means including energy storage means for commutating said controlled rectifying means; said energy storage means being chargeable, while said controlled rectifying means are non-conducting, to a voltage level which varies directly with the voltage level across said non-conducting controlled rectifying means.

14. A motor control system according to claim 13 wherein said energy storage means is chargeable to the larger of a preselected voltage level and a voltage level proportional to the voltage level across said controlled rectifying means when said controlled rectifying means are non-conducting.

15. A motor control system according to claim 13 including means for preventing said controlled rectifying means from being fired and for preventing said energy storage means from being discharged while the charging current of said energy storage means is above a predetermined level.

16. A motor control system according to claim 12 which also includes:
   (a) At least one armature resistor connectable into said motor armature circuit;
   (b) First means responsive to a preselected minimum time ratio of the occurrence of the high level of shunting to the occurrence of the low level of shunting for causing said diverter means to shunt current away from said one armature resistor;
   (c) Second means responsive to a preselected parameter of said motor means for progressively varying the time ratio between the occurrence of the high level of shunting and the low level of shunting to cause said diverter means to gradually change the series armature resistance of said motor armature circuit.

17. A motor control system according to claim 16 which includes means for changing the time ratio between the occurrence of the high level of shunting and the low level of shunting in response to the time rate of change of the preselected parameter.

18. A motor control system according to claim 17 including means responsive to a time rate of increase of the preselected parameter for increasing the time ratio of the occurrence of the high level of shunting with respect to the occurrence of the low level of shunting during field excitation control at low speeds during propulsion and means responsive to a time rate of increase of the preselected parameter for decreasing the time ratio of the occurrence of the high level of shunting with respect to the occurrence of the low level of shunting during armature resistance control during propulsion.

19. A motor control system according to claim 16 including means for inactivating said first means when braking occurs at speeds above a preselected speed of said motor means.

20. In a motor control system comprising motor means which include a motor armature circuit and a motor field circuit for energizing said motor means, a torque control system comprising, in combination:
   (a) A plurality of armature resistors having preselected resistance values being serially connectable into said motor armature circuit;
   (b) Current diverter means for shunting current away from one of said armature resistors, said current diverter means being controllable for providing a high level of shunting and a low level of shunting;
   (c) Means responsive to a preselected parameter of said motor means for progressively varying the time ratio between the occurrence of the high level of shunting and the occurrence of the low level of shunting of said diverter means to gradually change the effective resistance of said armature resistor;

(d) Switch means for sequentially adding said armature resistors to said armature circuit and sequentially subtracting said armature resistors from said armature circuit;

(e) Means for actuating said switching means in response to selected time ratios of shunting;

(f) Means responsive to the switching action of said switch means for rapidly adjusting the time ratio between the occurrence of the high level of shunting and the occurrence of the low level of shunting of said diverter means to preselected ratios which change the effective resistance of said one armature resistor to a resistance that prevents the occurrence of a substantial change in the series armature resistance of said motor armature circuit as a result of the actuation of said switch means.

21. A motor control system according to claim 20 wherein said switch means comprises electromechanical switches having contact arms, and the time ratio between the high level of shunting and the low level of shunting is adjusted in response to the movement of said contact arms toward adding said armature resistors to said armature circuit and subtracting said armature resistors from said armature circuit.

22. A motor control system according to claim 20 which further comprises means including an oscillator for providing periodic signals for changing said diverter means from the high level of shunting to the low level of shunting.

23. A motor control system according to claim 22 which further comprises means responsive to the periodic signals for controlling the time delay between successive high levels of shunting.

24. In a motor control system comprising motor means which include a motor armature circuit and a motor field circuit for energizing said motor means, a torque control system comprising, in combination:

(a) A plurality of armature resistors connectable into said motor armature circuit;

(b) Current diverter means for shunting current away from one of said armature resistors, said current diverter means being controllable for providing a high level of shunting and a low level of shunting;

(c) Means responsive to the armature current of said motor means for progressively varying the time ratio between the occurrence of the high level of shunting and the occurrence of the low level of shunting of said diverter means to gradually change the effective resistance of said armature resistor;

(d) Switch means for sequentially adding said armature resistors to said armature circuit and sequentially subtracting said armature resistors from said armature circuit;

(e) Means responsive to the switching action of said switch means for adjusting the time ratio between the occurrence of the high level of shunting and the occurrence of the low level of shunting of said diverter means to preselected ratios which change the effective resistance of said one armature resistor to a resistance that prevents the occurrence of a substantial change in the series armature resistance of said motor armature circuit as a result of the actuation of said switch means;

(f) Said means for progressively varying the time ratio between the occurrence of the high level of shunting and the occurrence of the low level of shunting including an armature current regulator circuit comprising:

(1) Means responsive to the switching action of said switch means for developing an open loop signal when the magnitude of the motor armature current is below a regulated current level;

(2) Means for summing the open loop signal with a signal derived from the armature current to provide a feedback signal of a preselected magnitude;

(3) Means for comparing the feedback signal with a reference signal to derive an error signal which controls the aforesaid time ratio, even though the magnitude of the motor current is below the regulated current level at the time of the switching action; and (4) Means for reducing the magnitude of the open loop signal at a controlled rate to allow the regulated armature current level to be attained by changing the series armature resistance at a maximum rate equal to the controlled rate.

25. A motor control system according to claim 20 which includes means for providing first signals which control the time ratio between the occurrence of the high level of shunting and the occurrence of the low level of shunting; means including energy storage means for filtering the first signals; and also includes means for discharging energy stored by said energy storage means in response to the switching action of said switch means.

26. A motor control system according to claim 20 wherein said means for varying the time ratio between the occurrence of the high level of shunting and the low level of shunting includes means for providing first signals proportional to the level of the preselected parameter, said signals containing an alternating-current ripple component; means for filtering the alternating-current ripple component out of time ratio controlling signals derived from said first signals; and means for discharging energy stored by the last mentioned means in response to the switching action of said switch means.

27. A motor control system according to claim 20 in which said current diverter means includes controlled rectifying means and means including energy storage means for commutating said controlled rectifying means; and means for preventing said diverter circuit from being actuated after said controlled rectifying means are commutated until the magnitude of the charging current of said energy storage means falls below a predetermined level.

28. A motor control system according to claim 22 in which said current diverter means includes controlled rectifying means and means including energy storage means for commutating said controlled rectifying means; means for charging said energy storage means to the larger of a predetermined voltage level and the voltage level which varies directly with the voltage level across said one armature resistor when said controlled rectifying means are non-conducting.

29. In a motor control system comprising motor means which include a motor armature circuit and a motor field circuit for energizing said motor means, a torque control system comprising, in combination:

(a) A plurality of armature resistors connectable into said motor armature circuit;

(b) Current diverter means for shunting current away from one of said armature resistors, said current diverter means being controllable for providing a high level of shunting and a low level of shunting;

(c) Means responsive to a preselected parameter of said motor means for progressively varying the time ratio between the occurrence of the high level of shunting and the occurrence of the low level of shunting of said diverter means to gradually change the effective resistance of said armature resistor;

(d) Switch means for sequentially adding said armature resistors to said armature circuit and sequentially subtracting said armature resistors from said armature circuit;

(e) Means responsive to the switching action of said switch means for adjusting the time ratio between the occurrence of the high level of shunting and the occurrence of the low level of shunting of said diverter means to preselected ratios which change the effective resistance of said one armature resistor to a resistance that prevents the occurrence of a substantial change in the series armature resistance of said motor armature circuit as a result of the actuation of said switch means;

(f) Means including an oscillator for providing periodic signals for changing said diverter means from the high level of shunting to the low level of shunting;

(g) Said current diverter means including controlled rectifying means, and means including energy storage means for commutating said controlled rectifying means; said energy storage means being chargeable, while said controlled rectifying means are non-conducting, to a voltage level which varies directly with the voltage level across said one armature resistor when said controlled rectifying means are non-conducting;

(h) Said energy storage means being chargeable to the larger of a predetermined voltage level and the voltage level which varies directly with the voltage level across said one armature resistor when said controlled rectifying means are non-conducting.

30. A motor control system according to claim 22 wherein said diverter means includes controlled rectifying means which are switched to a low impedance state during the occurrence of the high level of shunting current away from said one armature resistor and also includes means including energy storage means for commutating said controlled rectifying means; said motor control system also including means for preventing current from said energy storage means from flowing through said one armature resistor while said controlled rectifying means are being commutated.

31. A motor control system according to claim 30 wherein current from said energy storage means is prevented from flowing through said one armature resistor by rectifying means connected in series with said one armature resistor.

32. A motor control system according to claim 20 in which said current diverter means includes controlled rectifying means which are turned on in response to generated firing signals to provide the high level of shunting current frmo said one armature resistor; means for commutating said controlled rectifying means at the end of successive timing cycles in response to generated commutating signals; and means for synchronizing the generation of the firing signals with the occurrence of the commutating signals.

33. A motor control system according to claim 20 which also includes means responsive to the speed of said motor means and to a signal representing the desired tractive effort level for selecting the number of said armature resistors which are in said armature circuit when there is a requirement for a change in the tractive effort level of said motor means.

34. A motor control system according to claim 20 including first means for causing said motor means to generate a selected braking troque and means responsive to the actuation of said first means and to the speed of said motor means for determining which of said plurality of armature resistors are in said armature circuit at the start of braking.

35. For use in a motor control system comprising direct-current motor means which include a motor armature circuit and a motor field for energizing said motor means, a torque control system comprising, in combination:

(a) A plurality of armature resistors connectable into said motor armature circuit;

(b) Means for establishing successive timing cycles for said motor control system;

(c) Current diverter means controllable in response to a preselected parameter of said motor means for shunting a high level of current away from one of said armature resistors for progressively varying portions of succesive timing cycles to gradually change the effective resistance of said one armature resistor in said motor armature circuit;

(d) Switch means for sequentially adding said armature resistors to said armature circuit and sequentially subtracting said armature resistors from said armature cicuit; and (e) Means responsive to the switching action of said switch means for adjusting the occurence of the high level of diverter shunting in the timing cycles to change the effective resistance of said one armature resistor to a level that prevents the actuation of said switch means from causing a substantial change in the series armature resistance of said motor armature circuit.

References Cited

UNITED STATES PATENTS

| 2,307,481 | 1/1943 | Austin | 318—422 |
| 2,566,898 | 10/1951 | Austin | 324—63 |
| 3,299,338 | 1/1967 | Torii | 318—404 |
| 3,299,347 | 1/1967 | Torii | 318—422 |
| 3,257,597 | 6/1966 | Weiser | 318—414 |
| 3,360,705 | 12/1967 | Morris | 318—251 |
| 3,378,746 | 5/1968 | Weiser | 318—405 |
| 3,384,799 | 5/1968 | Thiele | 318—251 |
| 3,388,306 | 6/1968 | Koppelmann | 318—421 |

ORIS L. RADER, Primary Examiner

T. L. CROSSON, Assistant Examiner

U.S. Cl. X.R.

318—405, 417, 422, 428